US011429141B2

(12) United States Patent
Sasa et al.

(10) Patent No.: US 11,429,141 B2
(45) Date of Patent: Aug. 30, 2022

(54) DATA PROCESSING DEVICE, IMAGE READING APPARATUS, IMAGE FORMING APPARATUS, AND DATA PROCESSING METHOD

(71) Applicants: Tomohiro Sasa, Tokyo (JP); Hajime Tsukahara, Kanagawa (JP)

(72) Inventors: Tomohiro Sasa, Tokyo (JP); Hajime Tsukahara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 116 days.

(21) Appl. No.: 16/820,728

(22) Filed: Mar. 17, 2020

(65) Prior Publication Data

US 2020/0301468 A1  Sep. 24, 2020

(30) Foreign Application Priority Data

Mar. 22, 2019 (JP) .............................. JP2019-055077

(51) Int. Cl.
*G06F 1/14* (2006.01)
*G06F 1/10* (2006.01)

(52) U.S. Cl.
CPC . *G06F 1/14* (2013.01); *G06F 1/10* (2013.01)

(58) Field of Classification Search
CPC ..................................... G06F 1/14; G06F 1/10
See application file for complete search history.

(56) References Cited

U.S. PATENT DOCUMENTS 6,111,442 A * 8/2000 Aulet ........................ G06F 1/10
327/156
2007/0126686 A1* 6/2007 Chang .................. G09G 3/3648
345/98
(Continued)

FOREIGN PATENT DOCUMENTS

CN      107229009 A    10/2017
CN      107305405 A    10/2017
(Continued)

OTHER PUBLICATIONS

Extended European Search Report dated Aug. 14, 2020, issued in corresponding European Patent Application No. 20163283.3, 38 pages.
(Continued)

*Primary Examiner* — Phil K Nguyen
(74) *Attorney, Agent, or Firm* — Xsensus LLP

(57) ABSTRACT

A data processing device includes a data processing circuit and a data processing control circuit. The data processing circuit is configured to perform data processing on processing target data by use of an external clock, the processing target data being included in a data signal received from an outside, the external clock being included in the data signal. The data processing control circuit is configured to detect a state of the external clock and control execution of the data processing on the processing target data in accordance with the state of the external clock. The data processing control circuit is configured to operate with a clock having a lower impedance than an impedance of the external clock, and discard the processing target data received during a period in which an abnormality of the external clock is detected, in a case of detecting the abnormality of the external clock.

15 Claims, 23 Drawing Sheets

(56) References Cited

U.S. PATENT DOCUMENTS

| | | | |
|---|---|---|---|
| 2008/0069278 A1* | 3/2008 | Baumgartner | H04L 7/0337 375/354 |
| 2008/0225344 A1 | 9/2008 | Okamoto | |
| 2009/0222707 A1* | 9/2009 | Shin | G06F 11/1004 714/758 |
| 2011/0175653 A1* | 7/2011 | Tani | G06F 11/0754 327/156 |
| 2011/0254814 A1 | 10/2011 | Ku | |
| 2012/0224205 A1 | 9/2012 | Nakazawa | |
| 2012/0299505 A1* | 11/2012 | Ohashi | H03L 7/0807 315/250 |
| 2015/0131746 A1* | 5/2015 | Hirayama | H04N 21/4305 375/240.28 |
| 2017/0276509 A1 | 9/2017 | Nakajima et al. | |
| 2017/0302285 A1 | 10/2017 | Niwa | |
| 2020/0287643 A1* | 9/2020 | Fitting | H03K 3/0372 |

FOREIGN PATENT DOCUMENTS

| | | |
|---|---|---|
| JP | 9-191416 | 7/1997 |
| JP | 10-322324 | 12/1998 |
| JP | 2002-011160 A | 1/2002 |
| JP | 2012-056161 A | 3/2012 |
| JP | 2012-186527 | 9/2012 |
| JP | 2015-012400 | 1/2015 |
| WO | WO 2019/051218 A1 | 3/2019 |

OTHER PUBLICATIONS

Chinese Office Action dated Oct. 29, 2021, in corresponding Chinese Patent Application No. CN202010201011.1.

Office Action dated Apr. 28, 2022 in Chinese Patent Application No. 202010201011.1, 11 pages.

* cited by examiner

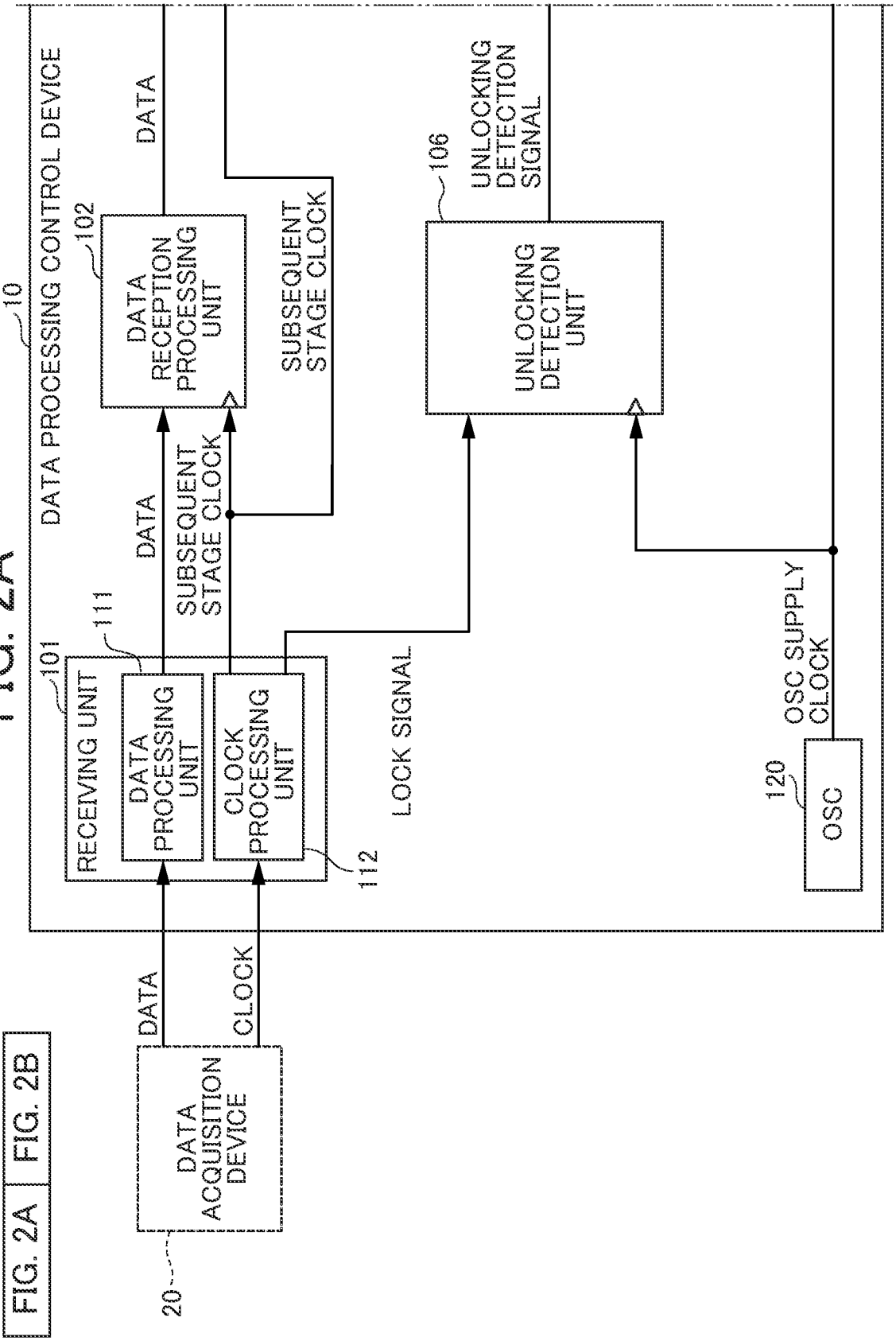

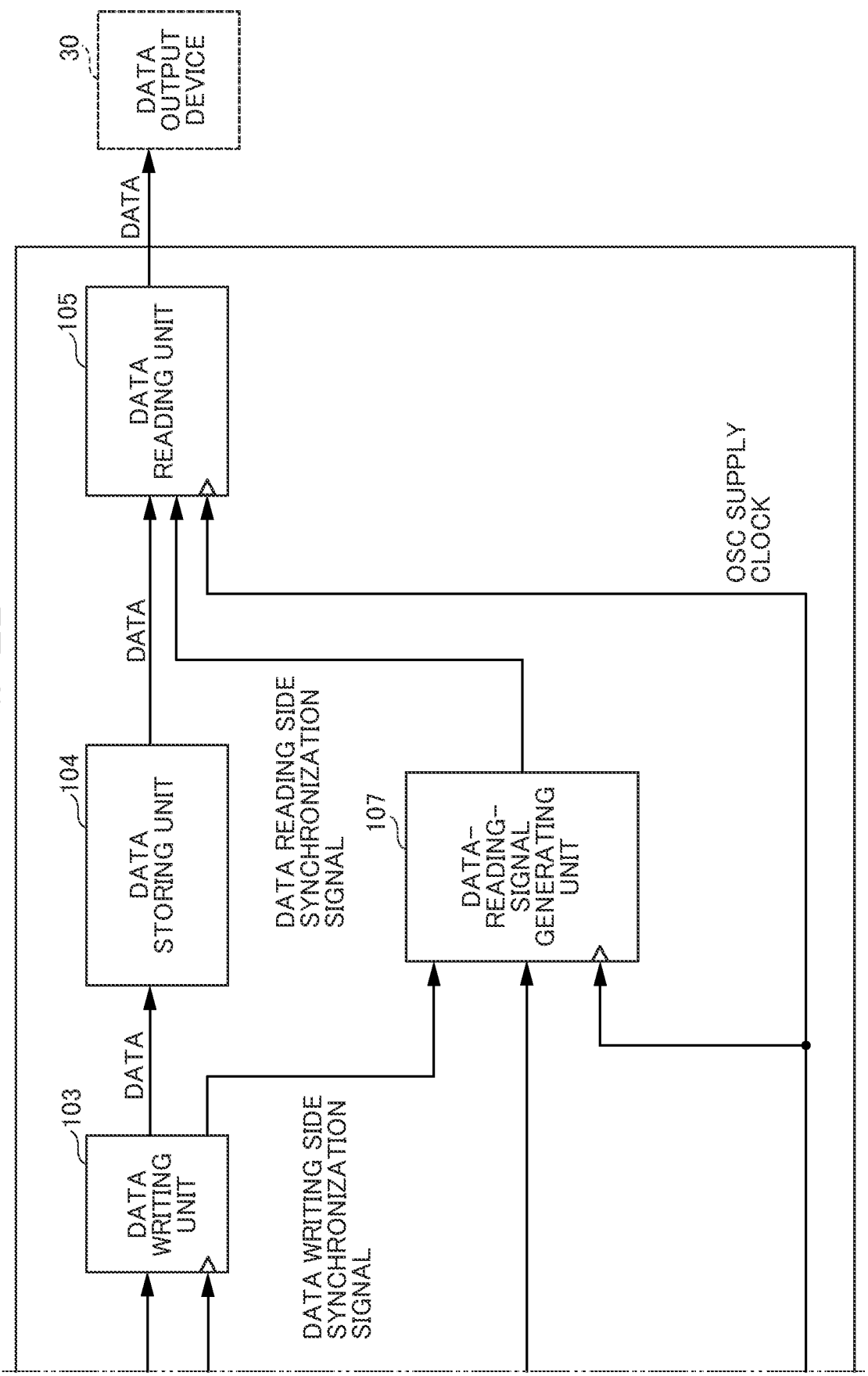

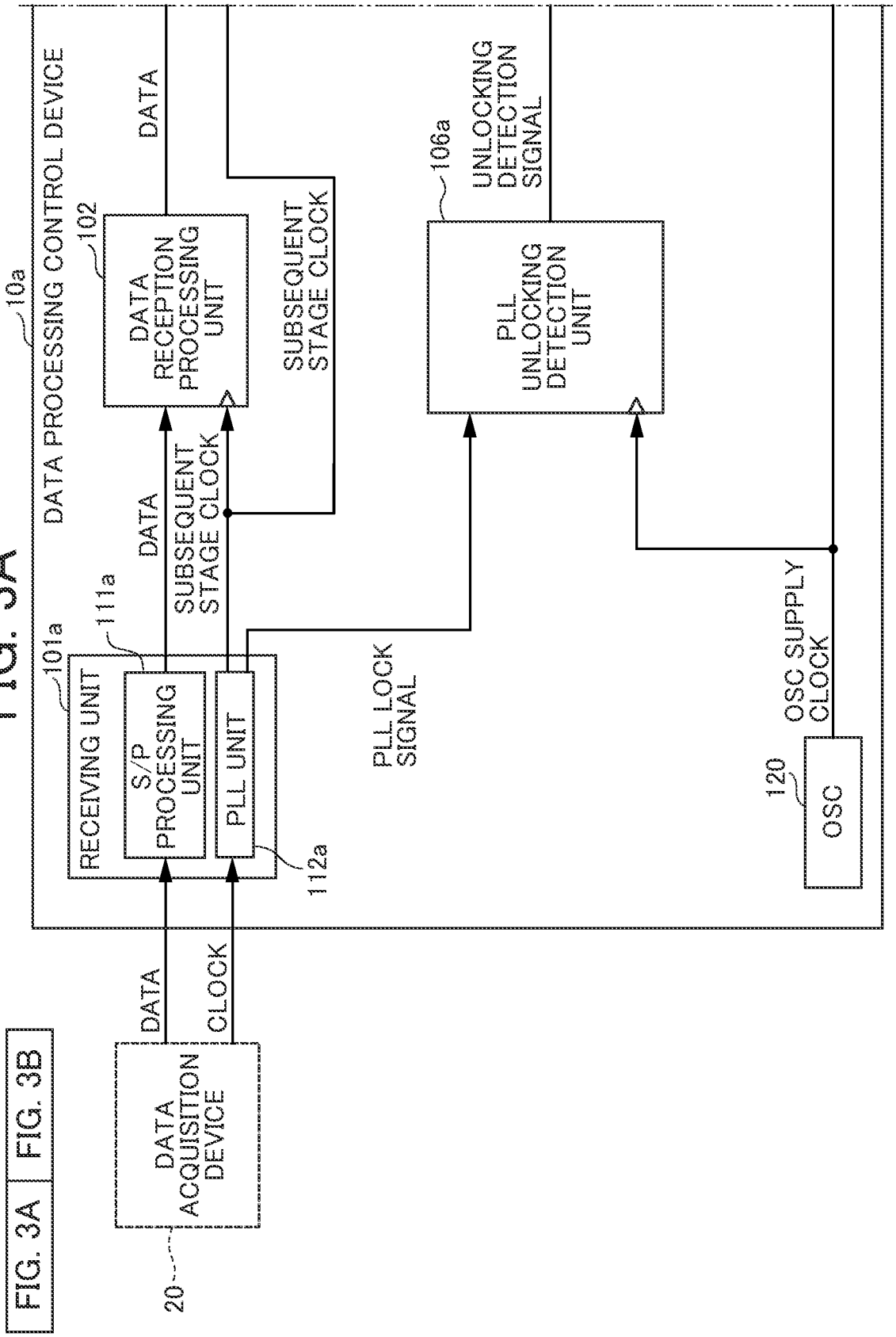

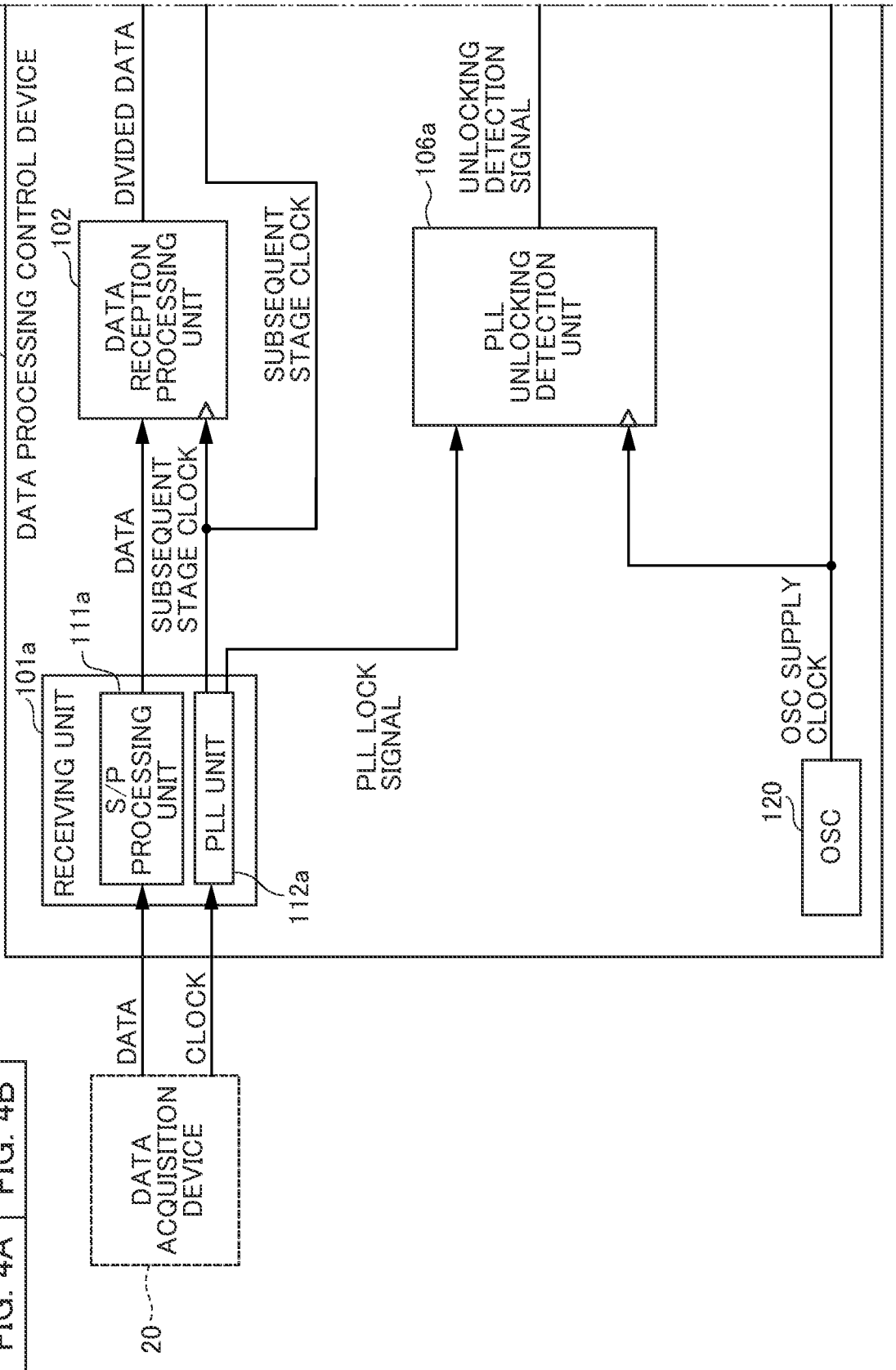

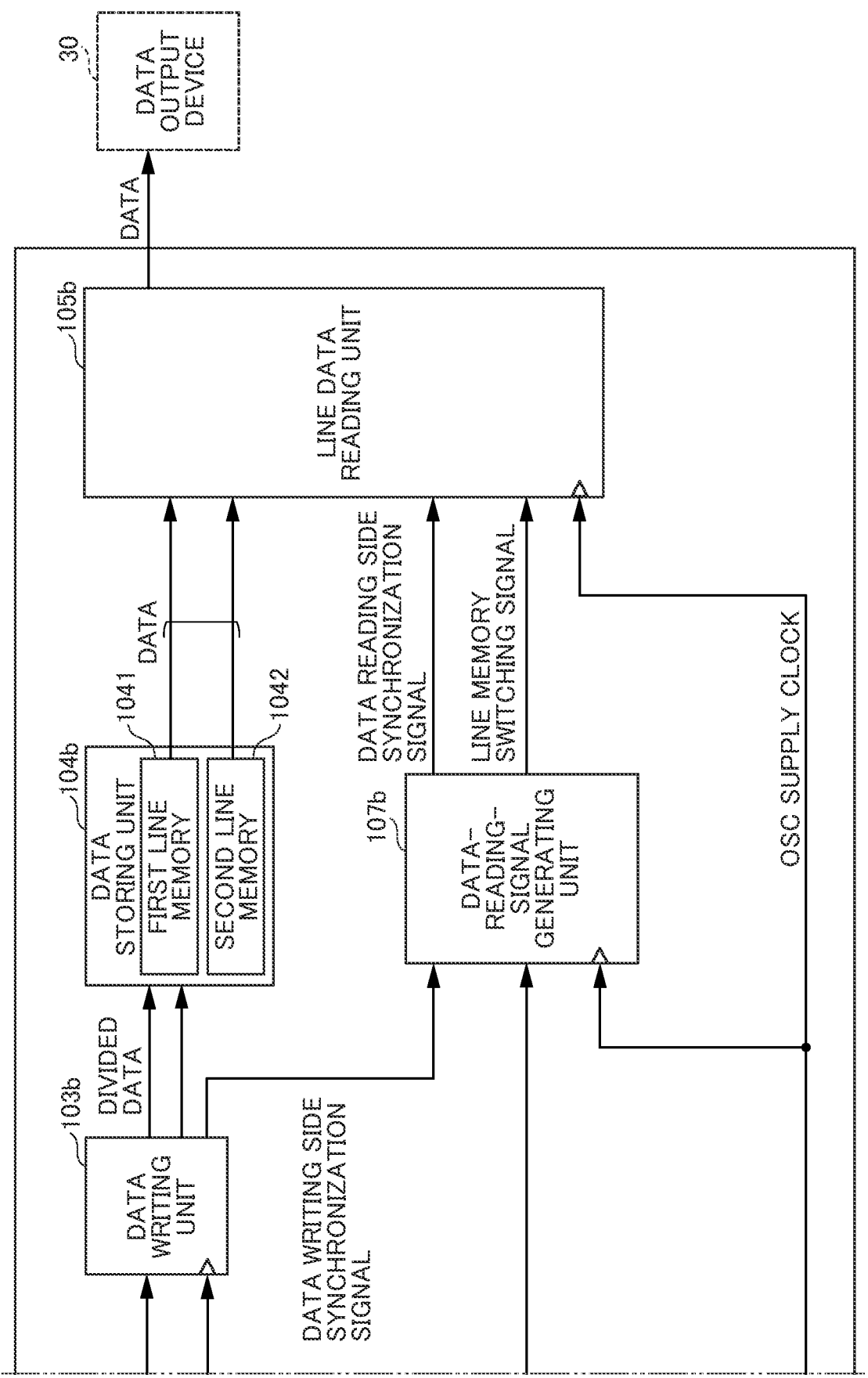

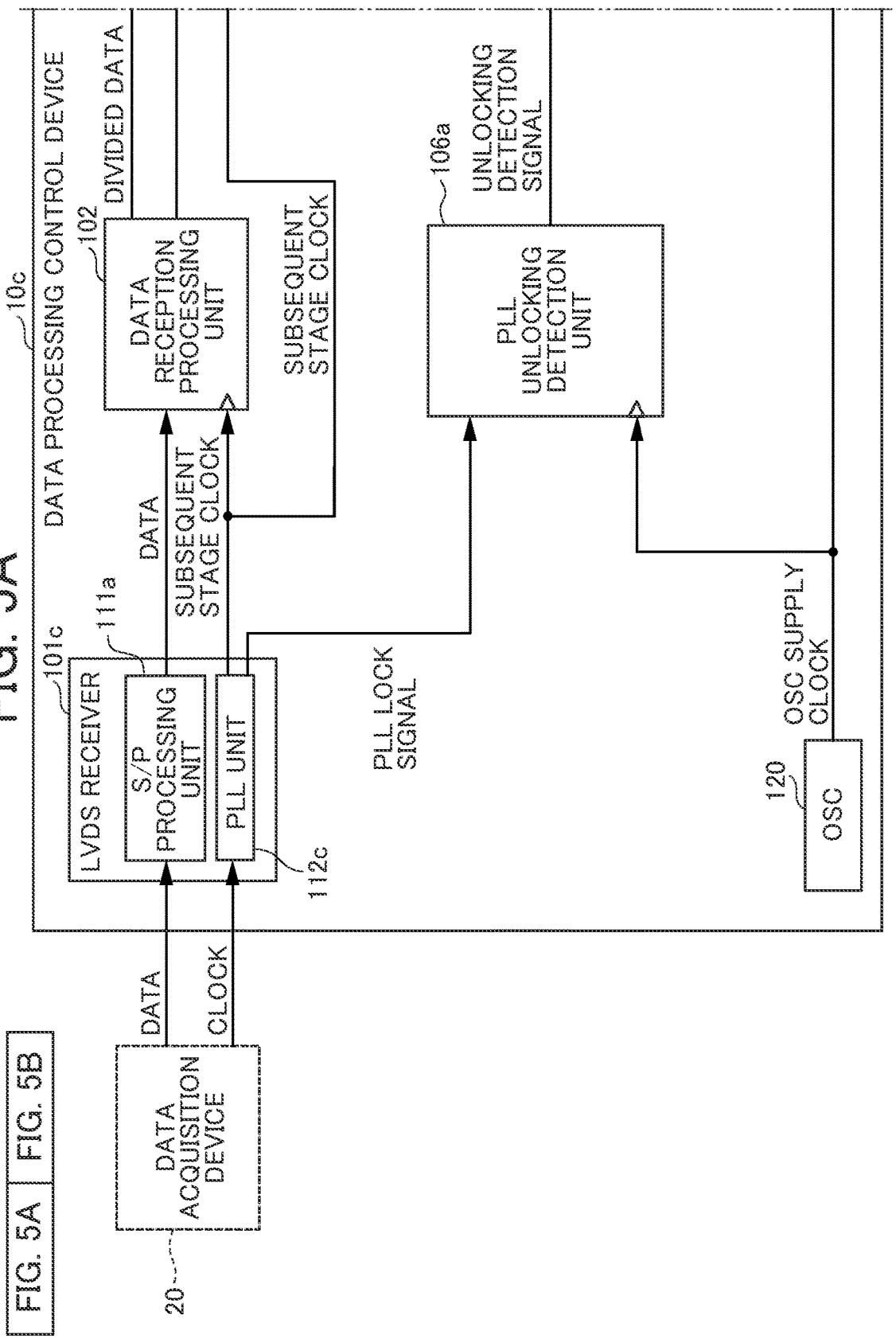

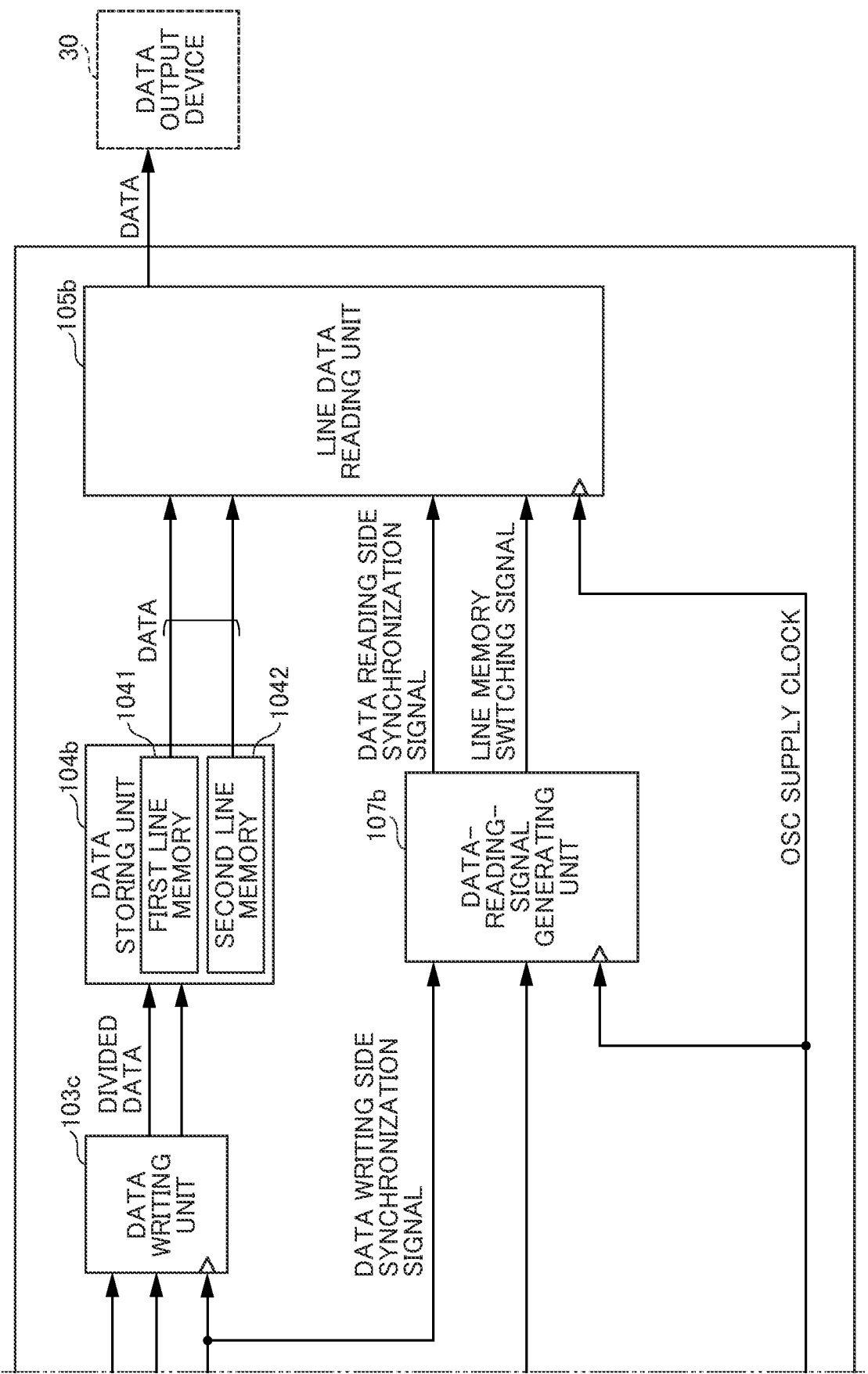

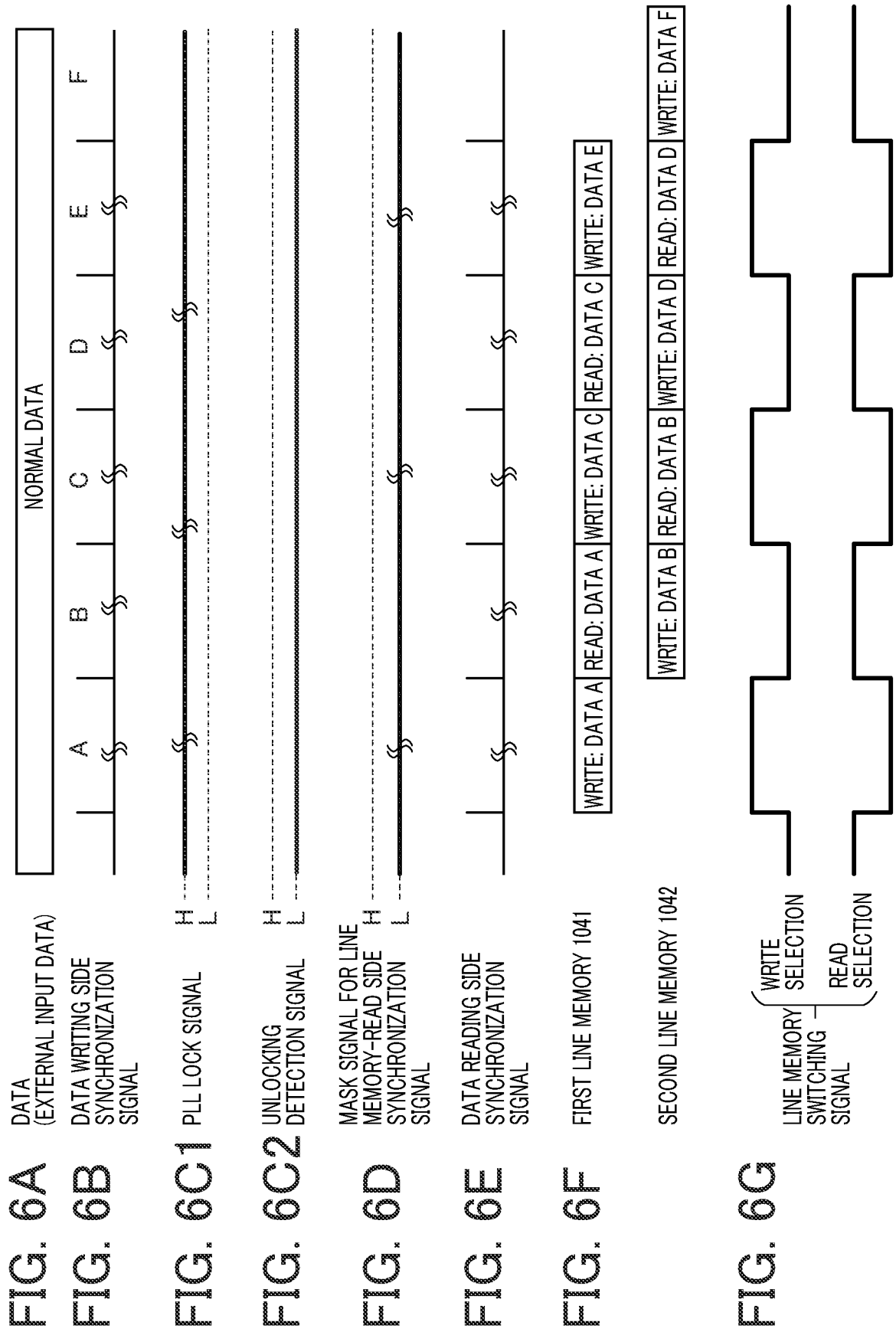

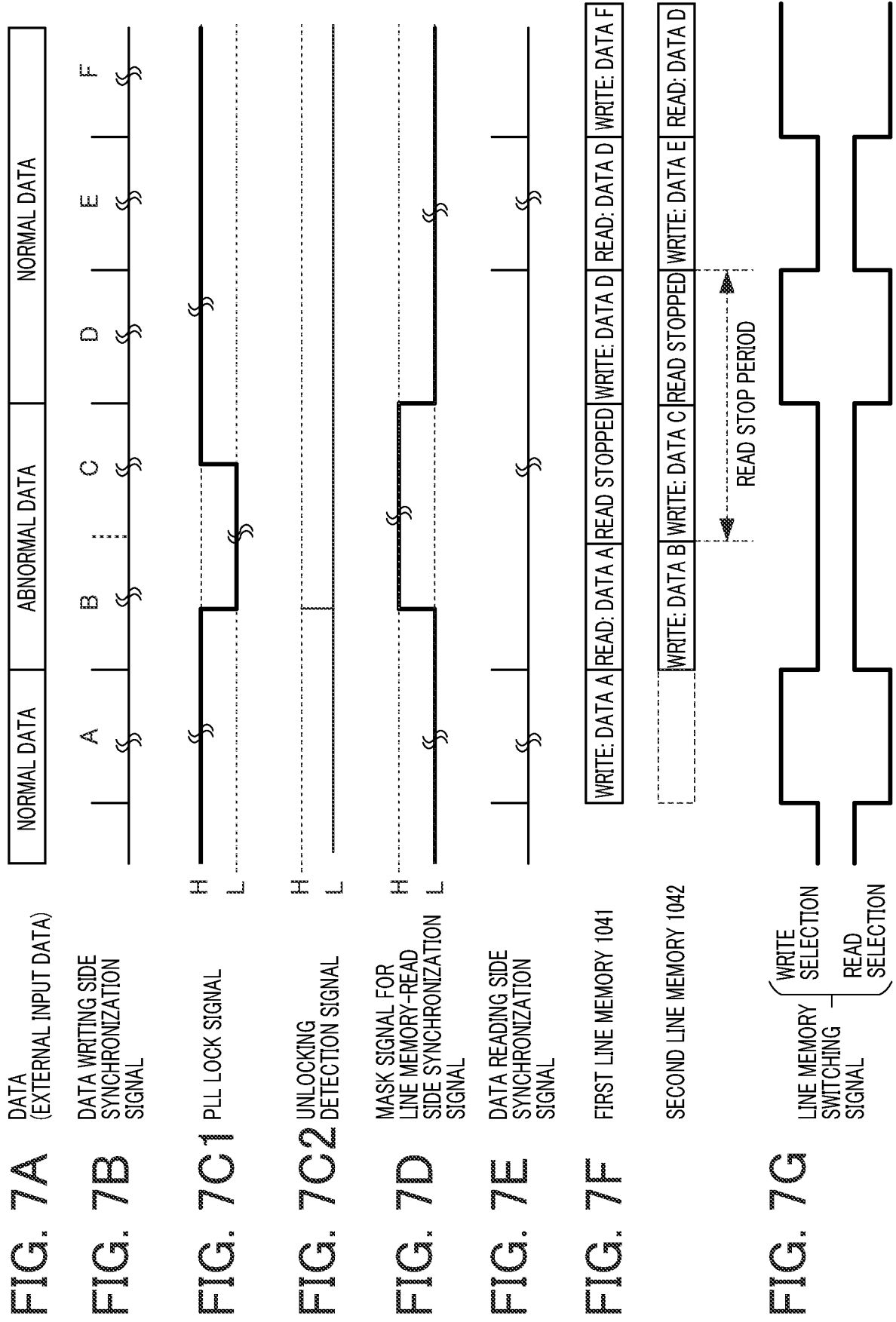

| FIG. 9A | FIG. 9B |

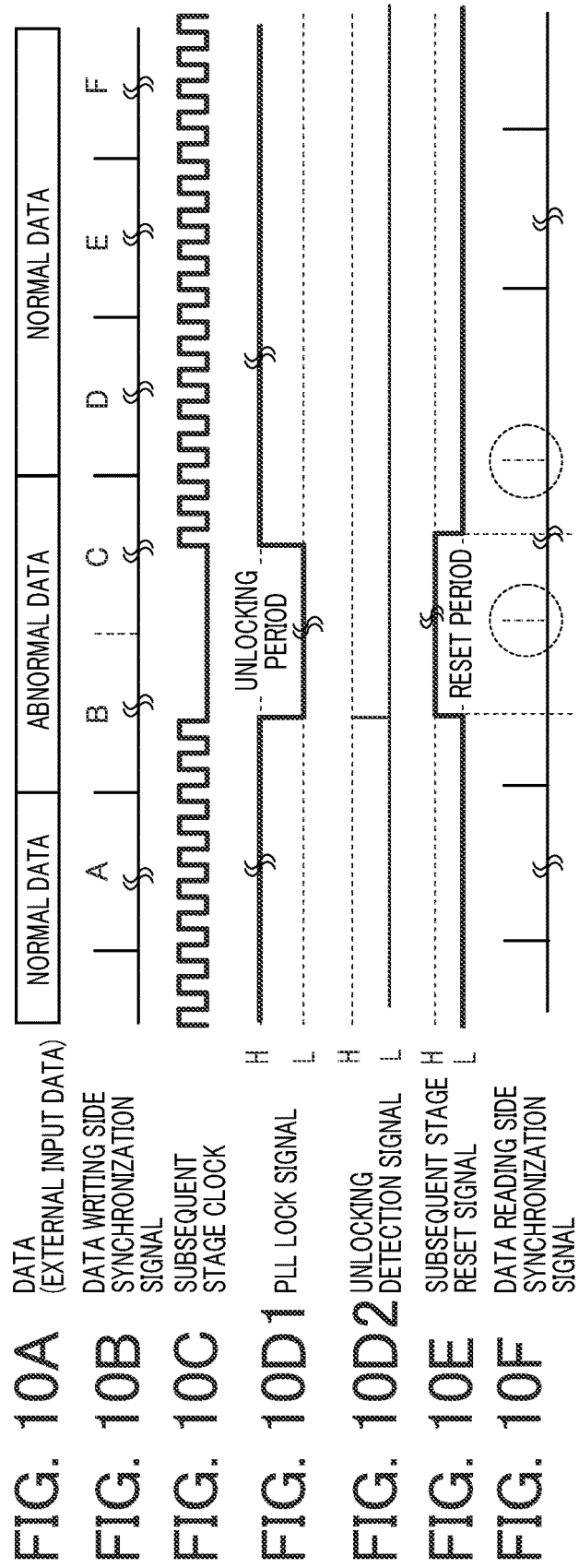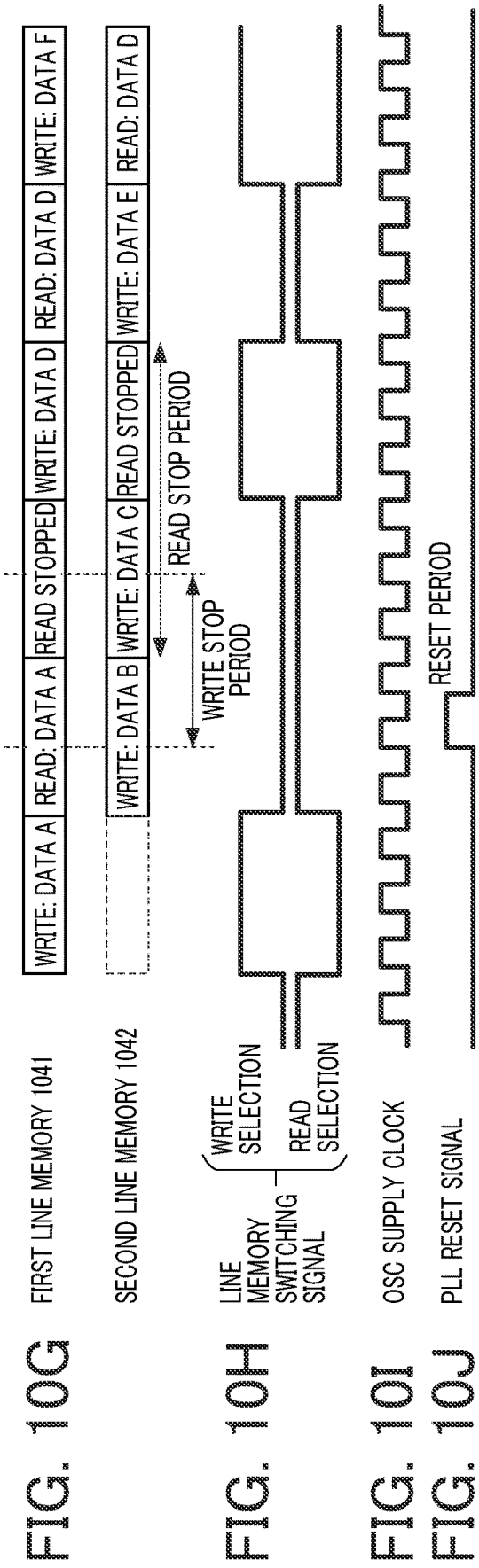

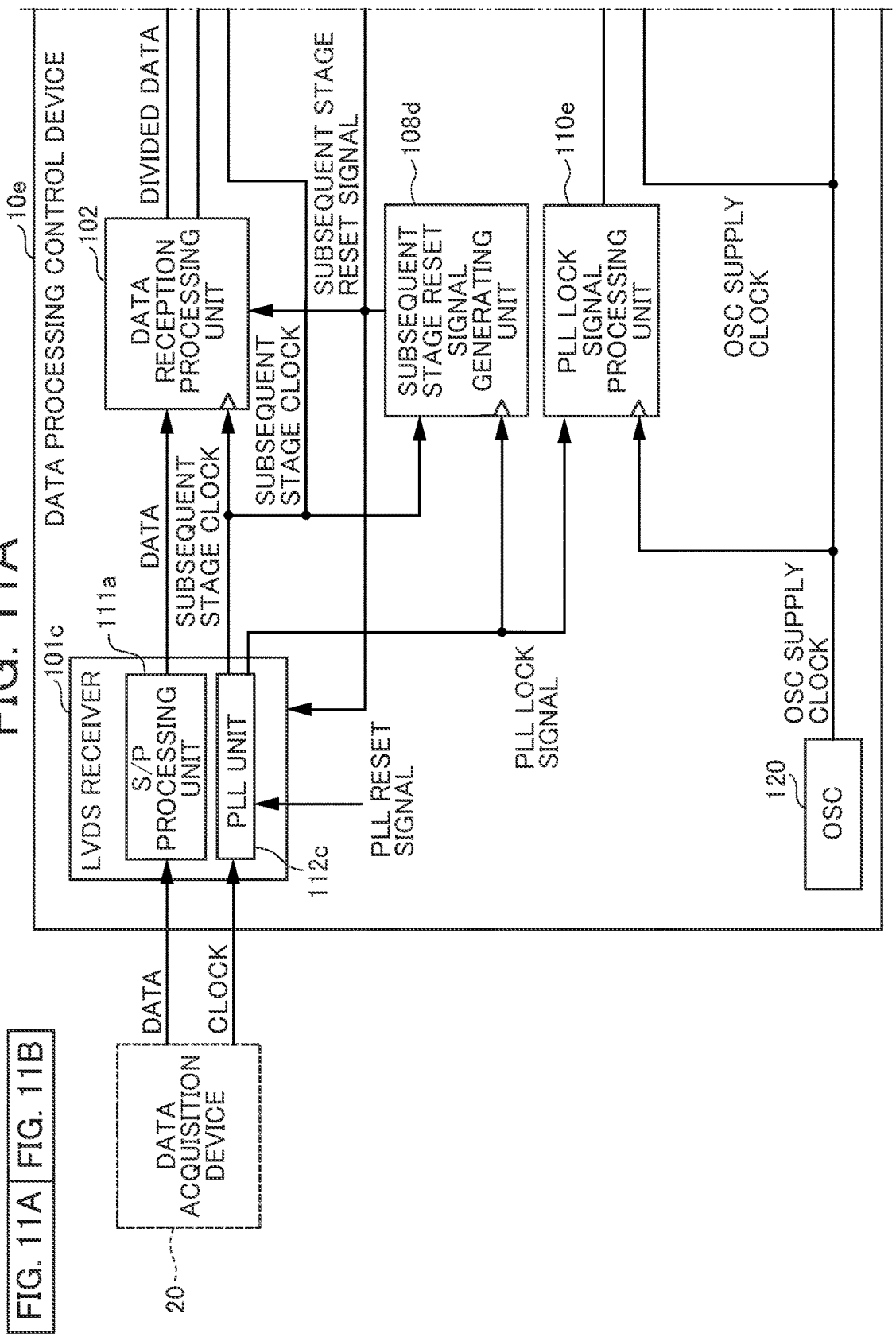

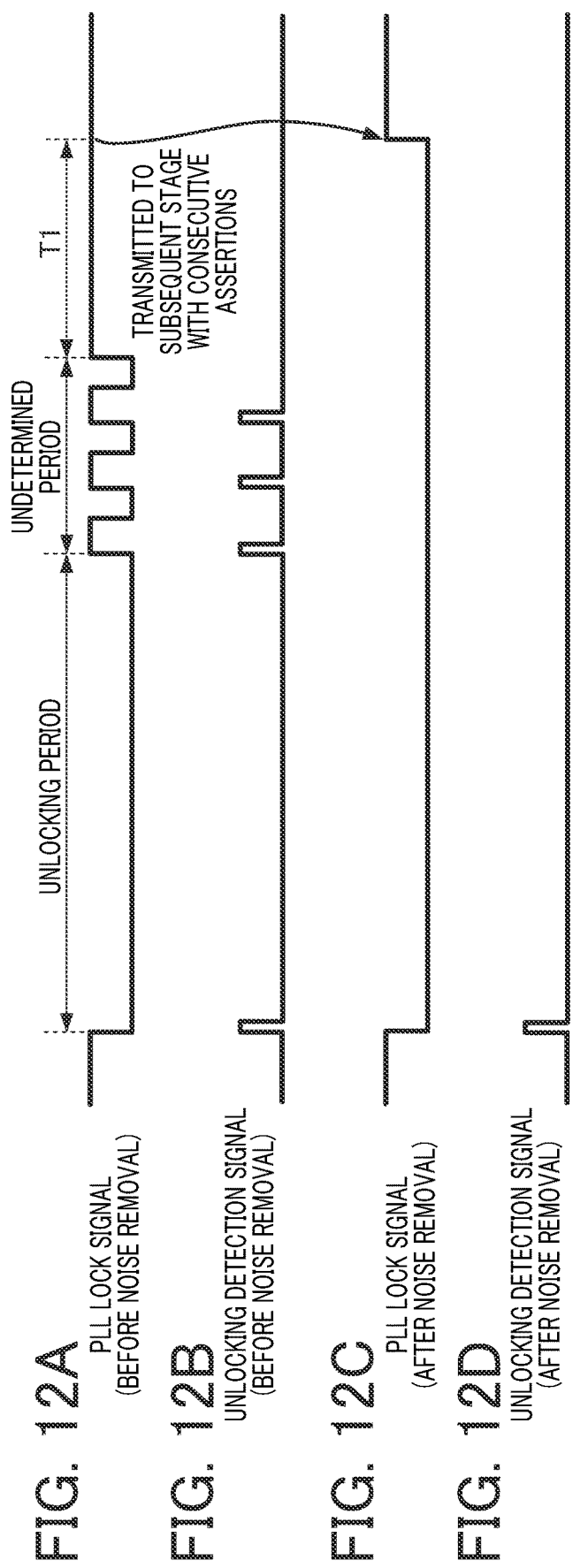

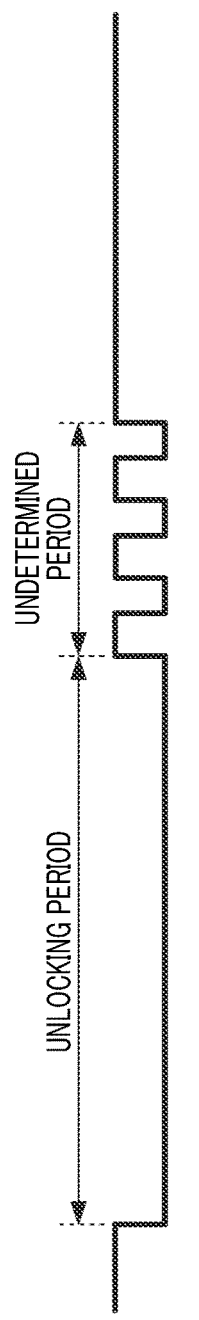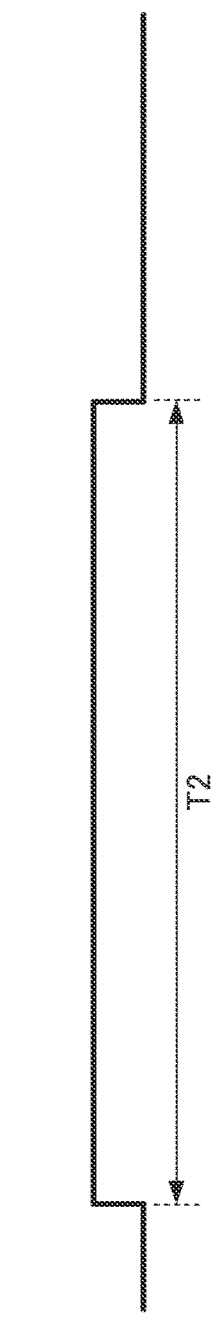
FIG. 13A PLL LOCK SIGNAL (BEFORE NOISE REMOVAL)
FIG. 13B UNLOCKING DETECTION SIGNAL (BEFORE NOISE REMOVAL)
FIG. 13C UNLOCKING DETECTION MASK SIGNAL
FIG. 13D UNLOCKING DETECTION SIGNAL (AFTER MASK PROCESS)

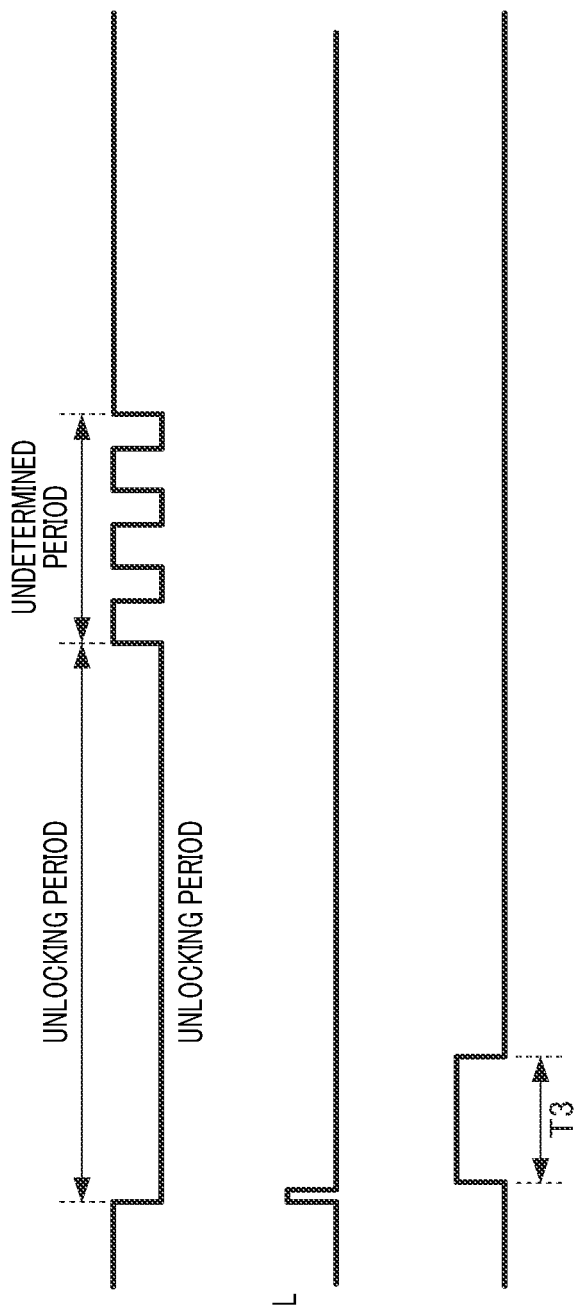

DATA PROCESSING DEVICE, IMAGE READING APPARATUS, IMAGE FORMING APPARATUS, AND DATA PROCESSING METHOD

CROSS-REFERENCE TO RELATED APPLICATION

This patent application is based on and claims priority pursuant to 35 U.S.C. § 119(a) to Japanese Patent Application No. 2019-055077, filed on Mar. 22, 2019, in the Japan Patent Office, the entire disclosure of which is hereby incorporated by reference herein.

BACKGROUND

Technical Field

Aspects of the present disclosure relate to a data processing device, an image reading apparatus, an image forming apparatus, and a data processing method.

Related Art

There is known a data processing device that is connected to an external device via a transmission line and performs predetermined data processing on processing target data included in a signal from the external device. The data processing device is installed in various apparatuses.

For example, in the case where the data processing device is installed in an image reading apparatus such as a scanner, image data are transmitted after being included in a data signal. The image data are generated from an image read by a data acquisition device including an image sensor and the like. Receiving the data signal, the data processing device performs predetermined data processing, and outputs the processed data signal to an image processing apparatus at a subsequent stage.

The data processing device generates an internal clock from a clock signal, and performs the predetermined data processing by use of the internal clock. Together with processing target data (for example, image data), the clock signal is included in the data signal received from the external device. Therefore, when, for example, noise due to static electricity or the like is superimposed on the data signal in the course of transmission, the clock signal is also affected by the noise. This causes a problem that normal processing cannot be performed on the processing target data. As a countermeasure against this problem, there is known a conventional technique for discarding data corresponding to an abnormal section when an abnormality is detected in a clock signal included in a received signal.

Furthermore, there is disclosed a technique for generating a reference signal for locking determination by use of a clock supplied from a source different from the source of a clock signal from the outside. The reference signal for locking determination is used to determine whether a synchronization signal transmitted from the outside has been locked (properly kept in synchronization).

SUMMARY

In an aspect of the present disclosure, there is provided a data processing device that includes a data processing circuit and a data processing control circuit. The data processing circuit is configured to perform data processing on processing target data by use of an external clock, the processing target data being included in a data signal received from an outside, the external clock being included in the data signal. The data processing control circuit is configured to detect a state of the external clock and control execution of the data processing on the processing target data in accordance with the state of the external clock. The data processing control circuit is configured to operate with a clock having a lower impedance than an impedance of the external clock, and discard the processing target data received during a period in which an abnormality of the external clock is detected, in a case of detecting the abnormality of the external clock.

In another aspect of the present disclosure, there is provided a data processing method to be performed in a data processing device including a data processing circuit configured to perform data processing on processing target data by use of an external clock. The processing target data is included in a data signal received from an outside. The external clock is included in the data signal. The data processing method includes: causing a data processing control circuit to detect a state of the external clock, the data processing control circuit being included in the data processing device and configured to operate with a clock having a lower impedance than an impedance of the external clock; and causing the data processing control circuit to discard the processing target data received during a period in which an abnormality of the external clock is detected, in a case of detecting the abnormality of the external clock.

In still another aspect of the present disclosure, there is provided an image reading apparatus that includes a data acquisition device and the data processing device. The data acquisition device is configured to transmit optically read image data together with a clock signal. The data processing device is configured to receive the image data and the clock signal from the data acquisition device and perform the data processing on the image data by use of the clock signal.

In yet another aspect of the present disclosure, there is provided an image forming apparatus that includes the data processing device and an image forming device. The image forming device is configured to form and output an image on a recording medium by use of data processed by a data processing device configured to perform predetermined data processing on processing target data input from an outside.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 2A and 2B (FIG. 2) are a configuration diagram illustrating the data processing device according to an embodiment of the present disclosure;

FIGS. 3A and 3B (FIG. 3) are a configuration diagram illustrating the data processing device according to another embodiment of the present disclosure;

FIGS. 4A and 4B (FIG. 4) are a configuration diagram illustrating the data processing device according to still another embodiment of the present disclosure;

FIGS. 5A and 5B (FIG. 5) are a configuration diagram illustrating the data processing device according to yet another embodiment of the present disclosure;

FIGS. 6A to 6G are timing charts illustrating examples of data write operation and data read operation in the data processing device according to the embodiment of FIGS. 5A and 5B;

FIGS. 7A to 7G are timing charts illustrating other examples of data write operation and data read operation in the data processing device according to the embodiment of FIGS. 5A and 5B;

FIGS. 10A to 10J are timing charts illustrating still other examples of data write operation and data read operation in the data processing device according to the embodiment of FIGS. 9A and 9B;

FIGS. 11A and 11B (FIG. 11) are a configuration diagram illustrating the data processing device according to a still further embodiment of the present disclosure;

FIGS. 12A to 12D are timing charts illustrating an example of a filtering process on a phase-locked loop (PLL) lock signal in the data processing device according to the embodiment of FIGS. 11A and 11B;

FIGS. 13A to 13D are timing charts illustrating an example of a mask process on the PLL lock signal in the data processing device according to the embodiment of FIGS. 11A and 11B;

FIGS. 14A to 14C are timing charts illustrating an example of a PLL reset signal in the data processing device according to the embodiment of FIGS. 11A and 11B;

Figure 1:
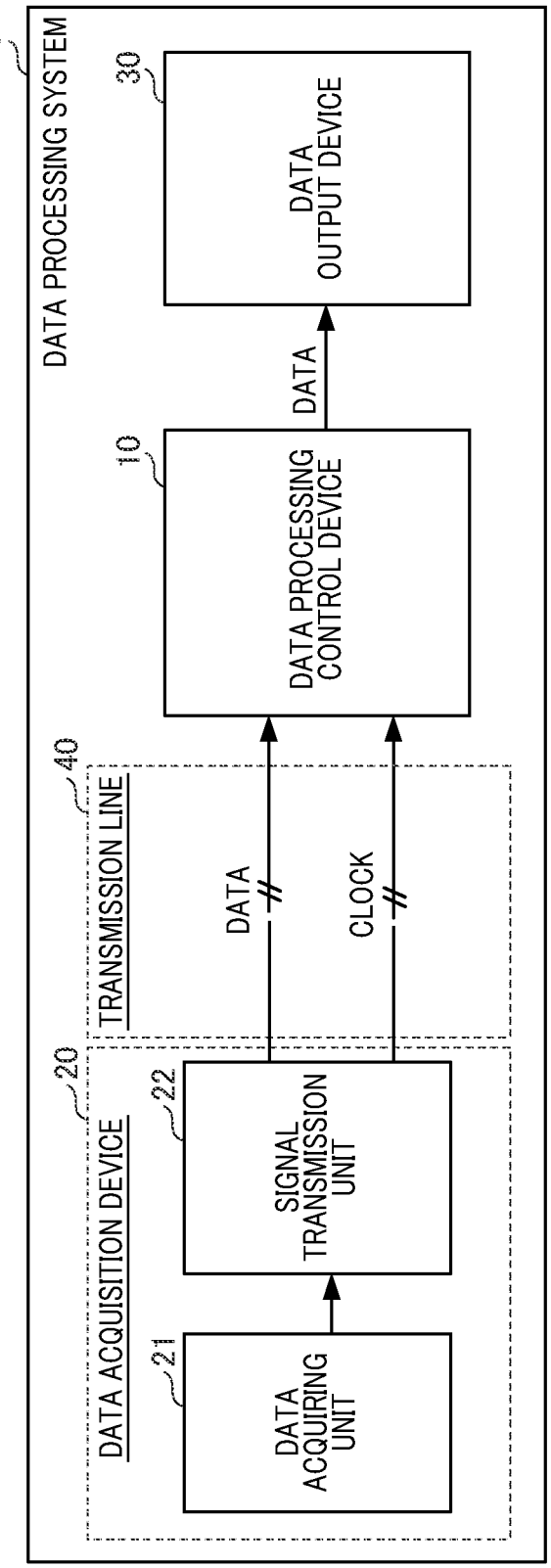
FIG. 1 is a configuration diagram illustrating an example of a data processing system including a data processing device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of Data Processing Device

A data processing device according to the present invention is to be installed in an apparatus that performs various processes by use of results of execution of predetermined data processing. For example, as will be described in detail later, the data processing device according to the present invention is used for processing image data from an image reading unit in an image reading apparatus such as a scanner that generates image data as a result of optically reading an image formed on a storage medium. In addition, the data processing device according to an embodiment of the present disclosure may be used in a data transmission section that delivers data to an image forming unit in the case of an apparatus, such as an image forming apparatus, that performs an image forming process based on data input from the outside. The following describes embodiments while citing, as examples, various apparatuses (system) equipped with the data processing device according to the present disclosure.

Overall Configuration of Data Processing System

The following describes a schematic configuration of a data processing system 1 to which the data processing device according to an embodiment of the present disclosure can be applied. The data processing system 1 illustrated in FIG. 1 is a system including a data processing control device 10, a data acquisition device 20, a data output device 30, and a transmission line 40. The data processing control device 10 is the data processing device according to an embodiment of the present disclosure.

The data acquisition device 20 includes a data acquiring unit 21 and a signal transmission unit 22. In the case of, for example, a scanner, the data acquiring unit 21 corresponding to an image reading unit acquires image data. Then, the signal transmission unit 22 converts the image data into a data signal, and transmits the data signal to the data processing control device 10.

The data processing control device 10 performs predetermined data processing based on processing target data and a clock signal included in the data signal received from the data acquisition device 20, and delivers the result of the processing to the data output device 30.

For example, in the case where the data processing system 1 is an image forming apparatus, the data output device 30 corresponds to an image forming device that performs an image forming process to form an image on a recording medium and ejects the recording medium.

The transmission line 40 includes, for example, a cable as a bundle of a plurality of signal lines for transmitting a data signal from the data acquisition device 20 to the data processing control device 10. Alternatively, the transmission line 40 includes a harness or the like. In general, transmission impedance in the transmission line 40 tends to be high. Thus, noise is likely to be superimposed on a data signal being transmitted. Therefore, the cable, the harness, or the like can be designed to eliminate the influence of external noise. However, it is difficult to completely eliminate the influence of noise caused by sudden static electricity or the like. Accordingly, there is a need to take measures to eliminate the influence of noise on a received data signal in the data processing control device 10. Note that the probability that a data signal is affected by noise in the transmission line 40 increases as the signal lines included in the transmission line 40 become longer.

The data processing control device 10 includes a data processing controller. The data processing controller detects an abnormality of a clock signal (external clock) transmitted together with processing target data from an external device. When detecting an abnormality of the received external clock, the data processing controller performs a process for discarding processing target data received in the same period as the abnormal external clock.

The data processing controller detects an abnormality of the external clock by use of a clock generated by an electronic oscillator (OSC) 120 mounted on the same circuit board that is included in the data processing control device 10.

The OSC 120 is disposed in the vicinity of the data processing controller included in the data processing control device 10. Accordingly, the length of the transmission line of a signal line for supplying a clock from the OSC 120 to the data processing controller is shorter than the length of the transmission line 40. Therefore, an OSC supply clock supplied from the OSC 120 has a lower impedance than the external clock, and is less likely to be affected by noise due to static electricity or the like than the external clock. That is, it can be said that the OSC supply clock does not become abnormal even when the external clock becomes abnormal.

Thus, the lower-impedance OSC supply clock is used as an operation clock for the data processing controller that detects an abnormality of the external clock to control the predetermined data processing in the data processing control device 10. As a result, it is possible to prevent abnormal processing target data from being output to a subsequent stage. In other words, in the data processing control device 10 according to the present embodiment, when a data signal transmitted from the data acquisition device 20 has been affected by noise, the affected abnormal data can be discarded to be excluded from data to be processed at the subsequent stage. Thus, it is possible to prevent abnormal data on which noise has been superimposed from being output in the predetermined data processing to be performed based on the external clock.

First Embodiment of Data Processing Control Device

Next, the data processing control device 10 as the data processing device according to an embodiment of the present disclosure will be described with reference to FIG. 2. As illustrated in FIG. 2, the data processing control device 10 includes a receiving unit 101, a data reception processing unit 102, a data writing unit 103, a data storing unit 104, a data reading unit 105, an unlocking detection unit 106, and a data-reading-signal generating unit 107. The receiving unit 101 receives a data signal from the data acquisition device 20.

The receiving unit 101 is a data receiver that includes a data processing unit 111 and a clock processing unit 112. The data processing unit 111 delivers processing target data included in a data signal transmitted from the data acquisition device 20 to subsequent circuits. Furthermore, the clock processing unit 112 delivers a clock signal (external clock) included in the data signal transmitted from the data acquisition device 20 to the subsequent circuits. The "subsequent circuits" refer to the data reception processing unit 102 and the data writing unit 103, which are included in a data processor that performs predetermined data processing on the processing target data.

The data reception processing unit 102 performs a process for dividing the data delivered from the data processing unit 111 into predetermined units by use of the subsequent stage clock delivered from the clock processing unit 112, and then performs a process for delivering the divided data to the data writing unit 103. Here, in the case where the processing target data are image data, the "predetermined unit" refers to, for example, a unit based on a pixel, such as a specific "pixel unit" or "line unit", or a unit based on the length of an image to be formed based on the data. The data divided into the predetermined units refer to "line data" divided into a plurality of line images forming a single image (surface) when the processing target data are image data and the predetermined unit is the "line unit".

The data writing unit 103 generates a data writing side synchronization signal at intervals of predetermined units based on the subsequent stage clock from the clock processing unit 112. Then, the data writing unit 103 sequentially writes the processing target data delivered from the data reception processing unit 102, to the data storing unit 104 based on the data writing side synchronization signal. In addition, the data writing unit 103 delivers the generated data writing side synchronization signal to the data-reading-signal generating unit 107.

The data storing unit 104 sequentially stores the delivered processing target data. Then, based on a data reading side synchronization signal, the processing target data stored in the data storing unit 104 are delivered to the data reading unit 105 to be output to the data output device 30.

The data reading unit 105 reads data from the data storing unit 104 based on the data reading side synchronization signal, and delivers the read data to the data output device 30.

The unlocking detection unit 106 operates based on an "OSC supply clock" supplied from the OSC 120, and detects "unlocking" of a lock signal related to the external clock delivered from the clock processing unit 112. The unlocking detection unit 106 delivers a detection result (unlocking detection signal) to the data-reading-signal generating unit 107.

The data-reading-signal generating unit 107 generates a data reading side synchronization signal, and delivers the data reading side synchronization signal to the data reading unit 105. The data reading side synchronization signal is a synchronization signal generated by synchronization of the data writing side synchronization signal delivered from the data writing unit 103 with the output clock (OSC supply clock) of the lower-impedance crystal oscillator (OSC 120). The data-reading-signal generating unit 107 delivers the data reading side synchronization signal to the data reading unit 105 in a period that does not correspond to an "unlocking period" in the unlocking detection signal delivered from the unlocking detection unit 106.

As illustrated in FIG. 2, all of the unlocking detection unit 106, the data-reading-signal generating unit 107, and the data reading unit 105 are circuits to be operated by the lower-impedance OSC supply clock. The unlocking detection unit 106, the data-reading-signal generating unit 107, and the data reading unit 105 are included in the data processing controller that detects an abnormality of the external clock to perform the predetermined data processing. That is, the data processing controller according to the present embodiment can operate without being affected by noise due to static electricity or the like.

When the unlocking detection unit 106 determines that the external clock is unlocked, an unlocking detection signal is output so as to notify to that effect. In addition, the data-reading-signal generating unit 107 generates a mask signal for a line memory-read side synchronization signal based on the unlocking detection signal. At the timing when the mask signal indicates that the period corresponds to the "unlocking period", the external clock is affected by noise. That is, there is a possibility that processing target data corresponding to this period are abnormal data. Therefore, a process for preventing readout from the data storing unit 104 is performed so as to prevent processing target data that may be abnormal data from being output to the data output device 30.

Thus, when the processing target data are, for example, image data, an image in which an abnormality has occurred can be discarded. Thus, an image to be output can be prevented from being affected by noise.

Note that the OSC 120 is exemplified by a crystal oscillator, but is not limited to the crystal oscillator. For example, a combination of a crystal oscillator and an oscillation cell, or a clock buffer may be used as the OSC 120.

As described above, in the data processing control device 10 according to the present embodiment, an unlocking detection signal is output from the unlocking detection unit 106 that operates by use of a clock having a lower impedance than the external clock. In addition, the data-reading-signal generating unit 107 generates a mask signal for a line memory-read side synchronization signal based on the unlocking detection signal. When the mask signal indicates that "the external clock is locked (processing target data are not affected by noise)", the data-reading-signal generating unit 107 turns on a data reading side synchronization signal for reading the processing target data from the data storing unit 104. Meanwhile, when the mask signal indicates that "the external clock is not locked (processing target data may be abnormal as a result of being affected by noise)", the data-reading-signal generating unit 107 turns off the data reading side synchronization signal for reading the processing target data from the data storing unit 104. As a result of thus controlling the process for reading data from the data storing unit 104, it is possible to prevent output of abnormal data.

Second Embodiment of Data Processing Control Device

Figure 3B:
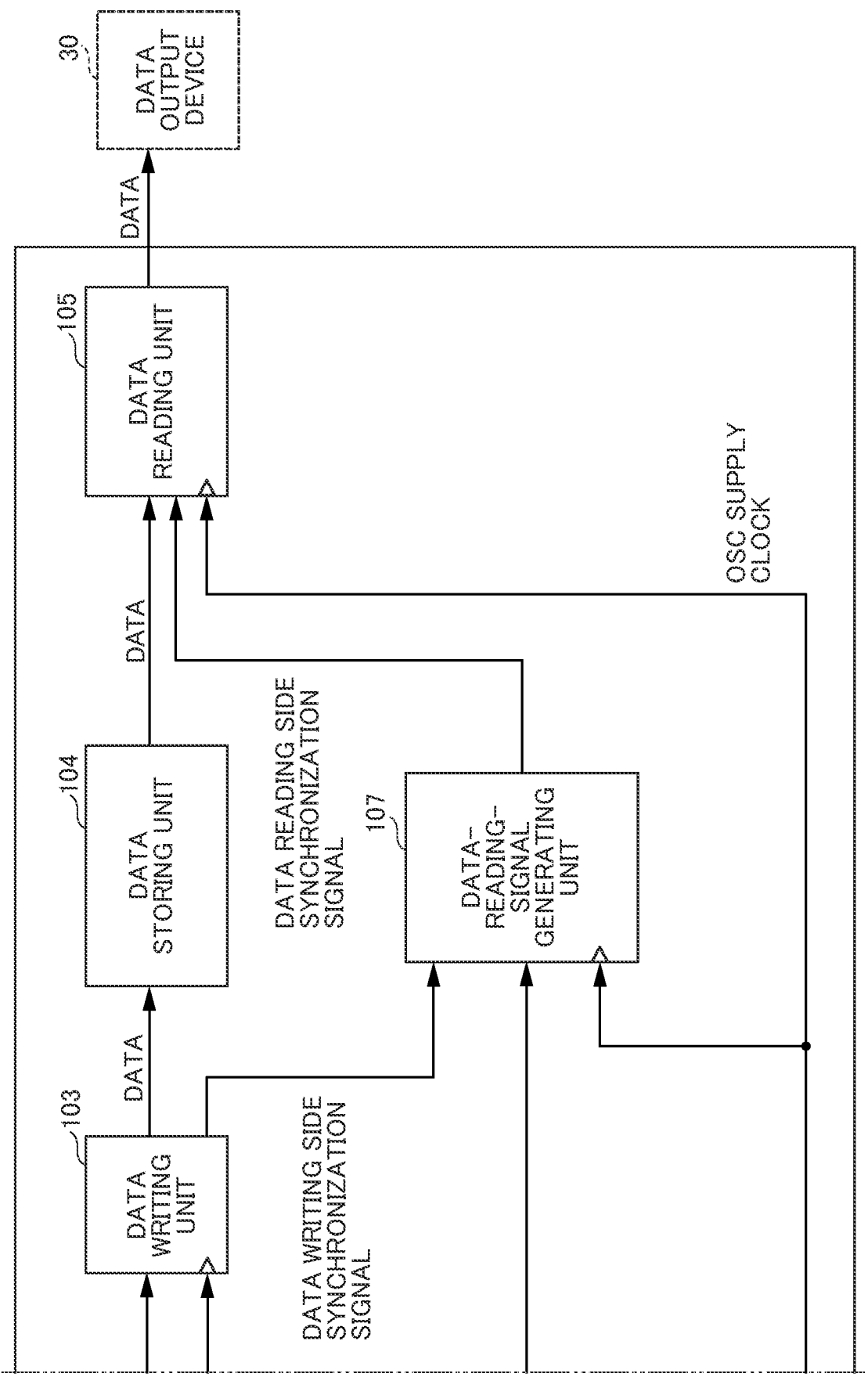

Next, the configuration of a data processing control device 10*a*, which is the data processing device according to another embodiment of the present disclosure, will be described with reference to FIG. 3. As illustrated in FIG. 3, the data processing control device 10*a* includes many constituent elements that are the same as the constituent elements of the data processing control device 10 already described. Hereinafter, the same constituent elements as the constituent elements of the data processing control device 10 are denoted by the same reference signs, and detailed description will be omitted. The data processing control device 10*a* includes a receiving unit 101*a* and a phase-locked loop (PLL) unlocking detection unit 106*a*, which make the data processing control device 10*a* different from the data processing control device 10 in configuration. Thus, the receiving unit 101*a* and the PLL unlocking detection unit 106*a* will be mainly described.

The receiving unit 101*a* includes an S/P processing unit 111*a* and a PLL unit 112*a*. As with the data processing control device 10 already described, the S/P processing unit 111*a* delivers data included in a data signal transmitted from the signal transmission unit 22 to subsequent circuits. Furthermore, as with the clock processing unit 112 already described, the PLL unit 112*a* generates an internal clock from a clock (external clock) included in the data signal transmitted from the signal transmission unit 22, and delivers the internal clock as a subsequent stage clock to the subsequent circuits. Accordingly, the PLL unit 112*a* is included in an internal clock generator.

Assume the case where the data acquiring unit 21 included in the data acquisition device 20 (see FIG. 1) is an image sensor and is a data acquisition unit that outputs multibit data. For example, when 10-bit data are output for each of red, green, and blue (RGB) in such a case, a 30-bit data signal is transmitted on the transmission line 40. The 30-bit data need to be transmitted to the data processing control device 10*a*. Thus, the receiving unit 101*a* needs to receive the 30-bit data signal.

In the case of transmitting the 30-bit data signal by the parallel transmission system, the number of signal line cables (harnesses) in the transmission line 40 increases, leading to a cost increase. In order to prevent this, the serial transmission system is used for transmission of multibit data. In the case of the serial transmission system, the signal transmission unit 22 converts parallel data into serial data, and transmits the serial data. Thus, the S/P processing unit 111*a* in the receiving unit 101*a* converts the serial data into parallel data. Then, the receiving unit 101*a* delivers the parallel data to the subsequent circuits.

In addition, the PLL unit 112*a* generates a subsequent stage clock by use of a clock included in the transmitted serial data, and delivers the subsequent stage clock to the subsequent circuits. That is, the PLL unit 112*a* generates a subsequent stage clock based on the external clock from the data acquisition device 20. Furthermore, when the external clock received from the signal transmission unit 22 has been locked, the PLL unit 112*a* delivers a lock signal to the PLL unlocking detection unit 106*a*.

The PLL unlocking detection unit 106*a* detects whether the PLL lock signal is "unlocked", based on the PLL lock signal delivered from the PLL unit 112*a* and an "OSC supply clock" supplied from the OSC 120. The PLL unlocking detection unit 106*a* delivers an "unlocking detection signal" indicating a detection result to the data-reading-signal generating unit 107.

The data-reading-signal generating unit 107 generates a mask signal for a line memory-read side synchronization signal based on the "unlocking detection signal". The mask signal indicates that the period corresponds to an unlocking period. The mask signal is a signal for controlling a data reading side synchronization signal.

The PLL unlocking detection unit 106*a* operates based on the OSC supply clock having a lower impedance than the external clock. Therefore, even if the external clock is affected by noise, operation of determination regarding the PLL lock signal can be performed in the PLL unlocking detection unit 106*a* regardless of the influence of noise. The same applies to the data-reading-signal generating unit 107. Accordingly, control is performed such that if abnormal data may be included in a part of data transmitted together with the external clock, the part is not output to the data output device 30, and no other data but normal data are output to the data output device 30. Thus, in the case where processing target data are image data, the influence of noise on an output image can be reduced.

Third Embodiment of Data Processing Control Device

Next, the configuration of a data processing control device 10*b*, which is the data processing device according to still another embodiment of the present disclosure, will be described with reference to FIG. 4. Also in describing the data processing control device 10*b*, detailed description will be omitted for the same constituent elements as the constituent elements of the data processing control device 10 and the data processing control device 10*a* already described. The following mainly describes a data writing unit 103b, a data storing unit 104b, a line data reading unit 105b, and a data-reading-signal generating unit 107b, which make the data processing control device 10b different from the data processing control device and the data processing control device 10a in configuration.

The data writing unit 103b writes divided data to a first line memory 1041 or a second line memory 1042 included in the data storing unit 104b. The divided data are data divided in units of lines in the data reception processing unit 102.

The data storing unit 104b includes the first line memory 1041 and the second line memory 1042. The data storing unit 104b alternately stores the divided data delivered from the data writing unit 103b in the first line memory 1041 and the second line memory 1042.

The line data reading unit 105b reads data from the first line memory 1041 and the second line memory 1042 based on a data reading side synchronization signal (line data reading side synchronization signal) from the data-reading-signal generating unit 107b. Then, the line data reading unit 105b delivers the read data to the data output device 30.

The line data reading side synchronization signal is a synchronization signal obtained by synchronization of a data writing side synchronization signal with an OSC supply clock. The data-reading-signal generating unit 107b delivers the line data reading side synchronization signal to the line data reading unit 105b. The data-reading-signal generating unit 107b delivers the line data reading side synchronization signal to the line data reading unit 105b in a period that does not correspond to an "unlocking period" in a mask signal for a line memory-read side synchronization signal generated by the data-reading-signal generating unit 107b.

As described above, the data processing control device 10b has the following configuration. The data reception processing unit 102 divides data in "units of lines". The data writing unit 103 writes the "line data" to the data storing unit 104b. Then, the line data reading unit 105b reads the stored line data. Reading line data later than the start of writing the line data enables operation of simply writing/reading the line data to be implemented.

However, in the case where the line data being written include abnormal data as a result of being affected by noise, the abnormal data written to the first line memory 1041 or the second line memory 1042 are read, and the reading of the abnormal data cannot be avoided.

Therefore, in order to avoid reading data from a line memory to which abnormal data have been written, two line memories (the first line memory 1041 and the second line memory 1042) are provided. Then, a line for which writing has been completed is read at a timing delayed by one line. After that, if there is an abnormality in the already written data, a reading process is not performed, and the line data including the abnormality are discarded.

The data processing control device 10b detects an abnormality of an external clock by use of a lower-impedance clock, and holds (divides) processing target data in units of lines. As a result, when there is a high possibility that an abnormality is included in data transmitted from the signal transmission unit 22, the data can be discarded in units of lines. Accordingly, in the case where processing target data are image data, it is possible to simplify a process of reducing the influence of noise on an output image.

Fourth Embodiment of Data Processing Control Device

Next, the configuration of a data processing control device 10c, which is the data processing device according to yet another embodiment of the present disclosure, will be described with reference to FIG. 5. The data processing control device 10c also includes many constituent elements that are the same as the constituent elements of the data processing control device 10, the data processing control device 10a, and the data processing control device 10b already described. The data processing control device 10c includes a low voltage differential signaling (LVDS) receiver 101c and a data writing unit 103c, which make the data processing control device 10c significantly different from the data processing control device 10b and the like in configuration. Hereinafter, the LVDS receiver 101c and the data writing unit 103c will be mainly described.

In the case where the data acquiring unit 21 is an image sensor and a charge-coupled device (CCD)/analog front-end (AFE) is used as an image reading element, data included in a data signal transmitted from the signal transmission unit 22 include a synchronization signal indicating the start of one line. The synchronization signal can be used to cause the data writing unit 103c to perform data writing operation and the line data reading unit 105b to perform line data reading operation.

The LVDS receiver 101c is a receiving circuit that supports data transmission by the LVDS system. The LVDS system is a differential signal system using two transmission lines. In the LVDS system, two different voltages are transmitted, and are compared on the receiving side. The LVDS system can be used to reduce electromagnetic Interference (EMI).

Flow of Read Operation and Write Operation in Normal Cases

Next, the following describes operation (write operation) of writing processing target data to the data storing unit 104 and the like and operation (read operation) of reading the processing target data from the data storing unit 104 and the like. The write operation and the read operation are respectively performed by, for example, the data writing unit 103 and the data reading unit 105 included in the data processing control device 10 according to the first embodiment. FIGS. 6A to 6G are timing charts illustrating the states of the write operation and the read operation. In the following, FIGS. 6A to 6G illustrate the case where data received from the data acquisition device 20 have not been affected by noise.

Hereinafter, in the present specification, data processing (write operation and read operation) is described by use of timing charts on the basis of the configuration of the data processing control device 10c. The flow of operation is substantially the same also in the case of adopting the configuration of the data processing control device 10, 10a, or 10b already described. For example, the data storing unit 104b is a line memory, and in addition, a memory system to be adopted in the data storing unit 104 is not limited in the data processing control device 10c. The data processing control device 10c differs from the data processing control devices 10, 10a, and 10b in this respect. However, in any case, write operation is performed based on a data writing side synchronization signal generated on the basis of a subsequent stage clock generated by the receiving unit 101 or 101a (LVDS receiver 101c). Read operation is performed based on a data reading side synchronization signal generated from the data writing side synchronization signal by synchronization with a clock (OSC supply clock) from the OSC 120.

As described above, FIGS. 6A to 6G illustrate examples of write operation and read operation performed in the case where noise is not superimposed on a data signal received from the data acquisition device 20.

FIG. 6A illustrates processing target data included in data signals normally received in succession during a predetermined period of time in the LVDS receiver 101c.

FIG. 6B illustrates a data writing side synchronization signal generated by the data writing unit 103c based on a subsequent stage clock output from a PLL unit 112c of the LVDS receiver 101c.

FIG. 6C1 illustrates a PLL lock signal output from the PLL unit 112c of the LVDS receiver 101c. The PLL lock signal is output as "H" when an external clock is not unlocked (not affected by noise).

FIG. 6C2 illustrates an unlocking detection signal output from the PLL unlocking detection unit 106a. The unlocking detection signal is output as "H" when the falling edge of the PLL lock signal is detected. The unlocking detection signal is output as "L" when an external clock is not unlocked (not affected by noise).

FIG. 6D illustrates a "mask signal for a line memory-read side synchronization signal" generated based on the unlocking detection signal in the data-reading-signal generating unit 107b. In the examples of FIGS. 6A to 6G, no abnormality has occurred in the received data signal. Thus, the unlocking detection signal does not indicate "unlocked". In this case, the "mask signal for the line memory-read side synchronization signal" is output as "L".

FIG. 6E illustrates the data reading side synchronization signal generated by synchronization of the data writing side synchronization signal with the OSC supply clock in the data-reading-signal generating unit 107b and delivered to the line data reading unit 105b.

FIG. 6F illustrates the timing of operation of writing to the data storing unit 104b based on the data writing side synchronization signal. Here, the processing target data has been divided at predetermined intervals in the data reception processing unit 102. Thus, write operation is performed in the division units. Data in a section corresponding to the data writing side synchronization signal "A" are written as "data A" to the first line memory 1041. Data in a section corresponding to the data writing side synchronization signal "B" are written as "data B" to the second line memory 1042. These write operations are performed alternately.

FIG. 6G illustrates a line memory switching signal generated in the data-reading-signal generating unit 107b. The line memory switching signal includes a write selection signal and a read selection signal that are switched in synchronization with the data reading side synchronization signal generated from the data writing side synchronization signal synchronized with the OSC supply clock. The line data reading unit 105b causes read operation to alternately switch between reading from the first line memory 1041 and reading from the second line memory 1042, based on the line memory switching signal.

When unlocked, the PLL lock signal is negated. In the examples of FIGS. 6A to 6G, the PLL lock signal is not unlocked. Thus, the PLL lock signal remains asserted. In this case, the unlocking detection signal (FIG. 6C2) output from the PLL unlocking detection unit 106a remains negated. In addition, the mask signal (FIG. 6D) for the line memory-read side synchronization signal generated by the data-reading-signal generating unit 107b indicates "not unlocked".

First, the data writing unit 103c writes "data A" to the first line memory 1041 on the basis of the data writing side synchronization signal. Subsequently, the line data reading unit 105b reads "data A" from the first line memory 1041 in response to a data reading signal generated by the data-reading-signal generating unit 107b as a result of synchronizing the data writing side synchronization signal with the OSC supply clock. At the same time, the data writing unit 103c writes "data B" to the second line memory 1042 on the basis of the data writing side synchronization signal. Subsequently, the data writing unit 103c writes "data C" to the first line memory 1041 on the basis of the data writing side synchronization signal. At the same time, the line data reading unit 105b reads "data B" from the second line memory 1042.

As described above, external input data divided into predetermined units are alternately written to the first line memory 1041 and the second line memory 1042 in the write operation, and alternately read by the line data reading unit 105b in the read operation. Then, the read data are output in the normal order to the data output device 30 at the subsequent stage.

Flow of Read Operation and Write Operation in Case of Abnormality

Next, the following describes operation (write operation) of writing processing target data to the data storing unit 104 and the like and operation (read operation) of reading the processing target data from the data storing unit 104 and the like. The write operation and the read operation are respectively performed by, for example, the data writing unit 103 and the data reading unit 105 included in the data processing control device 10 according to the first embodiment. As with FIGS. 6A to 6G, FIGS. 7A to 7G are timing charts illustrating the states of the write operation and the read operation. However, FIGS. 7A to 7G illustrate the case where data received from the data acquisition device 20 have been affected by noise.

In FIGS. 7A to 7G, it is assumed that processing target data included in a data signal received from the data acquisition device 20 have been affected by noise to be abnormal data at timing corresponding to sections B and C.

In this case, as illustrated in FIG. 7C1, the PLL lock signal output from the PLL unit 112c is set to "L" so as to indicate an "unlocked state" in sections B and C where an abnormality has occurred (data are affected by noise).

When the PLL lock signal becomes "L", the unlocking detection signal (FIG. 7C2) output from the PLL unlocking detection unit 106a is asserted. Based on the assertion of the unlocking detection signal, the data-reading-signal generating unit 107b asserts a mask signal (FIG. 7D) for the line memory-read side synchronization signal.

The data-reading-signal generating unit 107b generates a data reading side synchronization signal by the logical conjunction of the inversion signal of the mask signal and a data writing side synchronization signal (FIG. 7B) from the data writing unit 103c. Then, the data-reading-signal generating unit 107b outputs the data reading side synchronization signal to the line data reading unit 105b. The data reading side synchronization signal generated at this time is as illustrated in FIG. 7E. Thus, the data reading side synchronization signal is not asserted at the timing corresponding to sections B and C.

Therefore, as illustrated in FIG. 7F, the line data reading unit 105b does not read data from the data storing unit 104b (does not perform read operation) at this timing.

As illustrated in FIG. 7D, the mask signal is negated when data become normal as a result of being no longer affected by noise, that is, when the PLL lock signal turns to "H" and the data writing side synchronization signal is asserted. That is, when the data writing side synchronization signal is asserted, the mask signal is negated by a signal obtained by synchronization of the PLL lock signal with the OSC supply clock. The OSC supply clock is an operation clock of the data-reading-signal generating unit 107b.

The data processing control device 10c performs the read operation and the write operation as described above. As a result, the data processing control device 10c can discard data corresponding to a section where an abnormality has occurred and output no other data but normal data to the subsequent device. When the processing target data are image data and a predetermined section corresponds to a single scanning section, that is, when data are discarded in units of lines forming an image, data corresponding to a line where an abnormality has occurred are discarded.

The above description of the write operation and the read operation is based on the data processing control device 10c including two line memories. As described above, it is possible to implement substantially the same operation also in the other embodiments (data processing control devices 10, 10a, 10b, 10d, and 10e).

Example of Image Data Processing in Case of Unlocked PLL

Figure 8A:
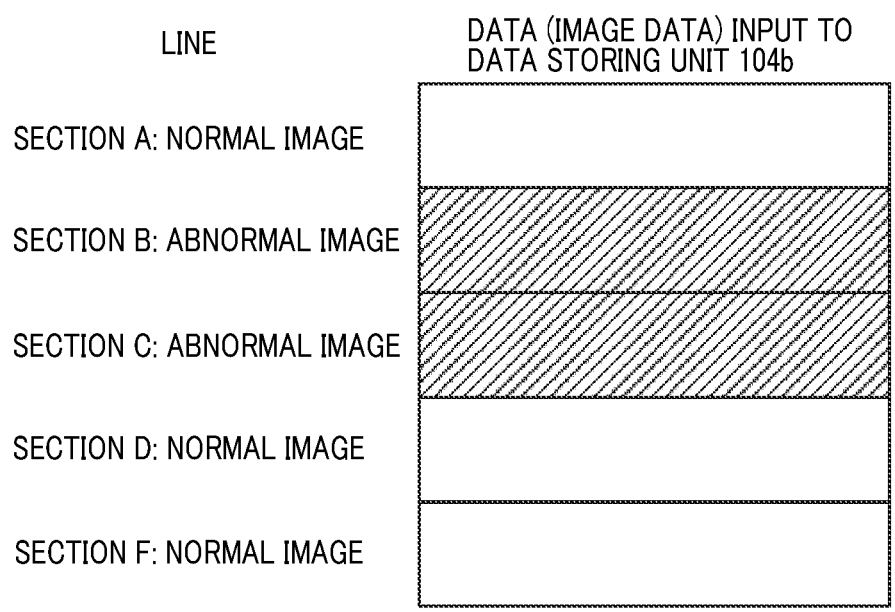
FIGS. 8A and 8B are diagrams schematically illustrating the states of data after being processed in write operation and read operation in the data processing device according to the embodiment of FIGS. 5A and 5B.
Figure 8B:
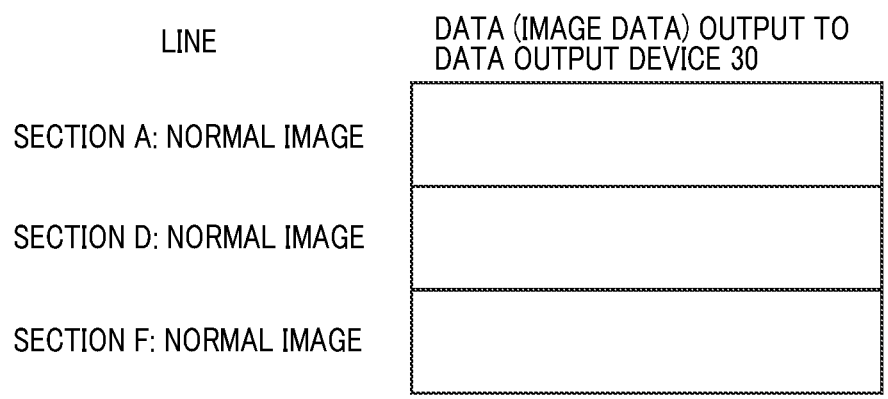

FIGS. 8A and 8B schematically illustrate the state of data (image data) output as a result of the write operation and the read operation illustrated in FIGS. 7A to 7G.

The following describes the case where the image data are processed in units of lines and an abnormal image is included in a plurality of lines. FIG. 8A illustrates data input to the line memory. Data corresponding to sections B and C are abnormal data. This is because sections B and C correspond to an unlocking period in which a PLL signal is unlocked.

As described with reference to the timing charts of FIGS. 7A to 7G, a portion (line data) where an abnormality has occurred is not read from the line memory (read operation is not performed). Then, the abnormal data are overwritten with line data corresponding to the next section. This serves as an equivalent to discarding the abnormal data. In the subsequent read operation, normal image data corresponding to section D and the subsequent section are read and output.

FIG. 8B illustrates an example of image data output by the read operation illustrated in the timing charts of FIGS. 7A to 7G. As illustrated in FIG. 8B, after normal image data corresponding to section A are output, the normal image data corresponding to section D are output. In this case, the data corresponding to the unlocking period are missing. In this case, the missing data cannot be restored. Thus, the image data are output with a lack of a part corresponding to the abnormal data. However, the abnormal data have been deleted. Thus, in particular, it is possible to prevent output of an abnormal image such as a "streaked image" generated when abnormal data are output as an image. Therefore, when the data processing control device 10c is used for image data processing, it is possible to prevent an influence of noise on image quality in the case where noise is superimposed on data due to static electricity or the like.

Fifth Embodiment of Data Processing Control Device

Figures 9, 9A:
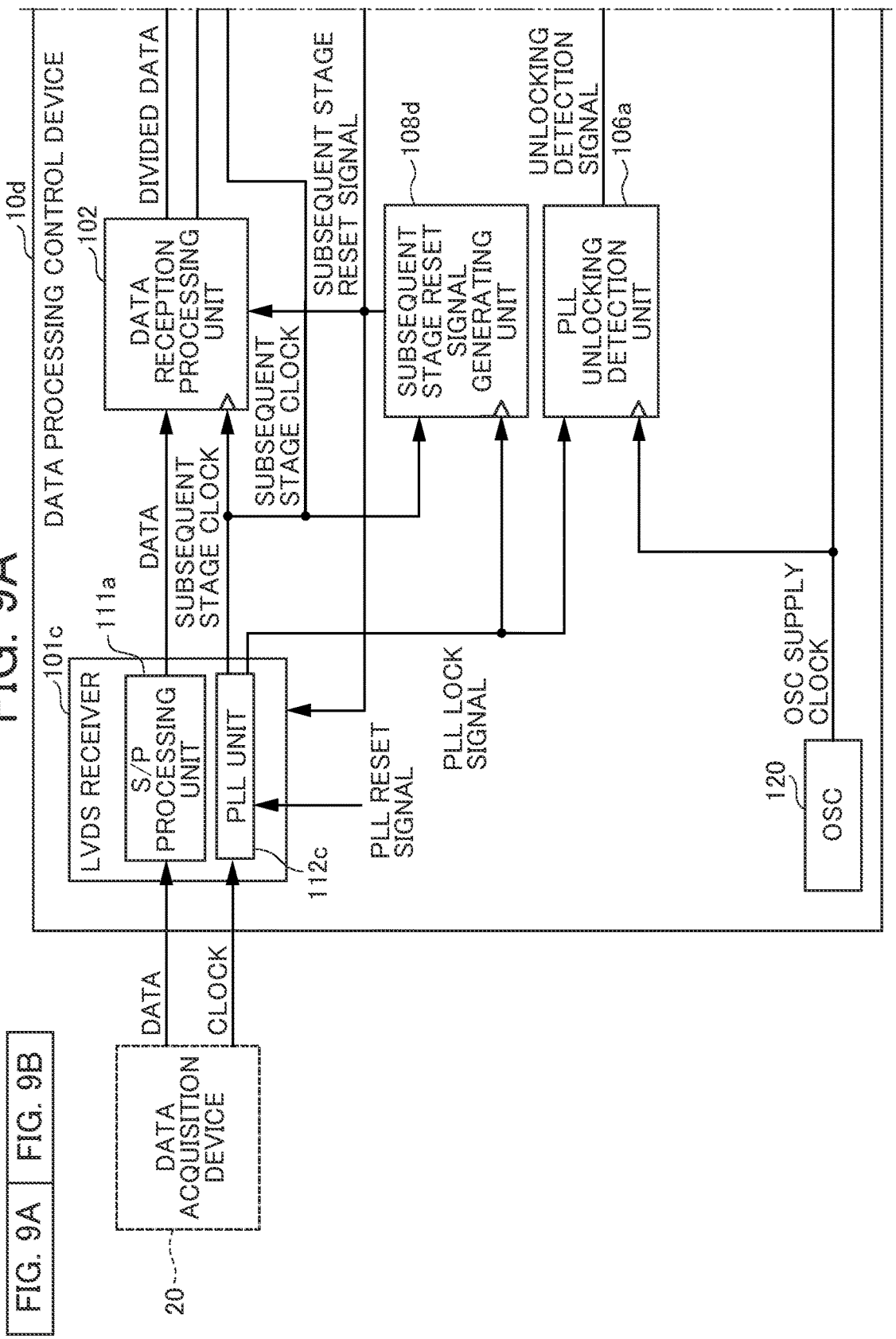
FIGS. 9A and 9B (FIG. 9) are a configuration diagram illustrating the data processing device according to a further embodiment of the present disclosure.
Figure 9B:
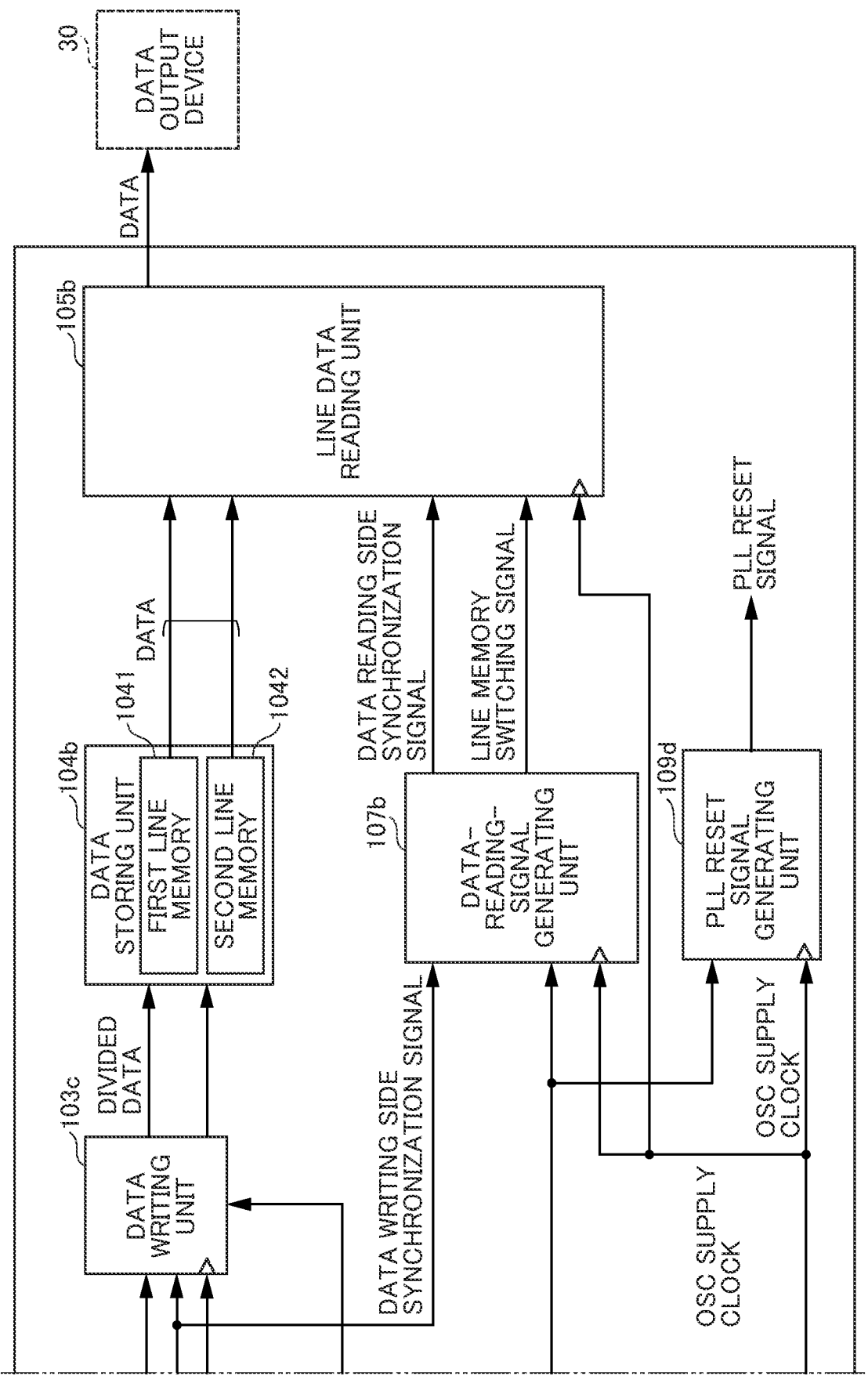

Next, the configuration of a data processing control device 10d, which is the data processing device according to a further embodiment of the present disclosure, will be described with reference to FIG. 9. The data processing control device 10d further includes a subsequent stage reset signal generating unit 108d and a PLL reset signal generating unit 109d in addition to the constituent elements of the data processing control device 10c already described. Hereinafter, these resetters will be mainly described.

The subsequent stage reset signal generating unit 108d generates a subsequent stage reset signal for achieving a state (reset state) where subsequent circuits are reset. Note that the subsequent circuits refer to the LVDS receiver 101c, the data reception processing unit 102, and a line data writing unit 103d. The LVDS receiver 101c, the data reception processing unit 102, and the line data writing unit 103d are reset by the subsequent stage reset signal during a PLL unlocking period. Unexpected operation can be prevented by the reset of the subsequent circuits. Furthermore, operation of writing to the data storing unit 104b is stopped during the reset period.

The PLL reset signal generating unit 109d operates by use of a lower-impedance OSC supply clock supplied from the OSC 120. The PLL reset signal generating unit 109d generates and outputs a PLL reset signal for achieving a state (reset state) where the PLL unit 112c of the LVDS receiver 101c is reset. The PLL reset signal generating unit 109d outputs the PLL reset signal based on an unlocking detection signal output from the PLL unlocking detection unit 106a, so as to perform a reset and then cancel the reset. The reset is performed for a period corresponding to a period in which the specification (device specification) of the PLL unit 112c included in the LVDS receiver 101c is satisfied. As a result, the operation of the PLL unit 112c can be returned to normal.

Flow of Reset Operation in Case of Unlocked PLL

With reference to timing charts of FIGS. 10A to 10J, the following describes "write operation" by the data writing unit 103c, "read operation" by the line data reading unit 105b, and "reset operation" for addressing an unlocked PLL in the data processing control device 10d.

As in FIGS. 7A to 7G, the timing charts of FIGS. 10A to 10J are based on the assumption that processing target data included in a data signal received from the data acquisition device 20 have been affected by noise to be abnormal data at the timing corresponding to sections B and C.

As illustrated in FIG. 10C, when an abnormality occurs in an external clock in the course of section B (when the external clock is affected by noise), a subsequent stage clock is brought into an abnormal state. At this time, as illustrated in FIG. 10D1, a PLL lock signal output by the PLL unit 112c is brought into an unlocking period, and continues to be output as "L".

The subsequent stage reset signal generating unit 108d asserts the subsequent stage reset signal, and continues to output the subsequent stage reset signal as "H" when the PLL lock signal becomes "L". The subsequent stage reset signal generating unit 108d negates the subsequent stage reset signal when the PLL lock signal returns to "H", that is, when the subsequent stage clock returns to normal. While the subsequent stage reset signal is "H", the subsequent circuits are reset. Thus, as illustrated in FIG. 10B, no data writing side synchronization signal is output from the data writing unit 103c. That is, the data writing unit 103c does not perform operation of writing to the data storing unit 104b (first line memory 1041).

Furthermore, while the subsequent stage reset signal is "H", no data writing side synchronization signal is output. Thus, as illustrated in FIG. 10F, the data-reading-signal generating unit 107b generates no data reading side synchronization signal. Therefore, as illustrated in FIG. 10G, the read operation is stopped, and the abnormal data are discarded without being output.

In addition, as illustrated in FIG. 10J, the PLL reset signal is output in a predetermined reset period when the PLL lock signal starts to indicate that the PLL lock signal is "unlocked". As a result, a reset is performed for the period corresponding to the period in which the specification (device specification) of the PLL unit 112c included in the LVDS receiver 101c is satisfied. Then, the reset can be canceled to return the operation of the PLL unit 112c to normal. Thus, the subsequent stage clock also returns to normal.

Sixth Embodiment of Data Processing Control Device

Figure 11B:
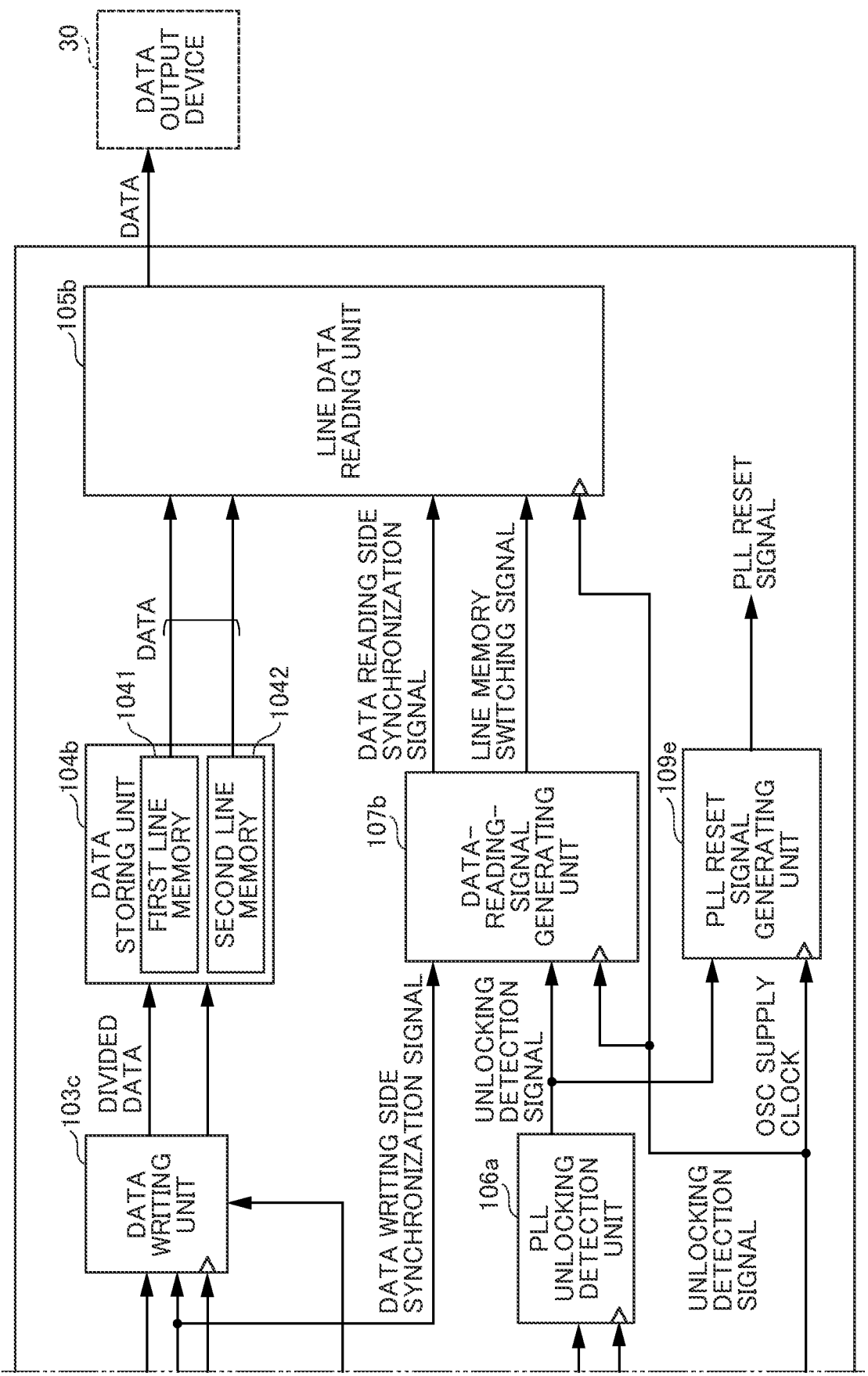

Next, the configuration of a data processing control device 10e, which is the data processing device according to a still further embodiment of the present disclosure, will be described with reference to FIG. 11. The data processing control device 10e further includes a PLL lock signal processing unit 110e and a PLL reset signal generating unit 109e in addition to the constituent elements of the data processing control device 10d already described. The PLL lock signal processing unit 110e is provided at a stage prior to the PLL unlocking detection unit 106a.

The PLL lock signal processing unit 110e performs a filtering process and a mask process on a PLL lock signal, and delivers the processed PLL lock signal to the PLL unlocking detection unit 106a.

The PLL reset signal generating unit 109e includes a PLL lock signal assertion period setting circuit.

First Operation Example of PLL Lock Signal Processing Unit

Next, a filtering process by a filter circuit included in the PLL lock signal processing unit 110e will be described with reference to timing charts of FIGS. 12A to 12D. FIG. 12A illustrates a PLL lock signal output from the PLL unit 112c.

As illustrated in FIG. 12A, it cannot be determined whether the PLL lock signal, which is a signal for detecting the unlocked state, is "1 (unlocked)" or "0 (not unlocked)" for a certain period of time after a device inputs an external clock to the PLL unit 112c until an output (subsequent stage clock) from the PLL unit 112c is stabilized. This period is referred to as an "undetermined period". In the undetermined period, the PLL lock signal repeatedly switches between "1" (H) and "0" (L) as illustrated in FIG. 12A.

When a PLL lock signal as illustrated in FIG. 12A is delivered to the PLL unlocking detection unit 106a, an unlocking detection signal is output as illustrated in FIG. 12B. With such an unlocking detection signal, the data-reading-signal generating unit 107b cannot generate a normal data reading side synchronization signal.

FIG. 12C illustrates a PLL lock signal subjected to a filtering process performed by the PLL lock signal processing unit 110e according to the present embodiment. Compared with FIG. 12B, the repetition of "H" and "L" in the undetermined period has been eliminated.

In the filtering process, when the PLL lock signal is continuously asserted during a period corresponding to "period T1", that is, when the unlocked state is continuously detected for a specific period of time, the PLL lock signal is notified to the PLL unlocking detection unit 106a provided at the subsequent stage. Until then, the PLL unlocking detection unit 106a is not notified that the PLL lock signal is "H". FIG. 12D illustrates an unlocking detection signal output from the PLL unlocking detection unit 106a in this way.

According to the above-described filtering process, a period during which the PLL lock signal for the undetermined period is asserted ("H") is shorter than the predetermined period T1. Thus, a corresponding unlocking detection signal does not indicate "unlocked". The PLL lock signal processing unit 110e detects the falling edge of the PLL lock signal (after noise removal). Thus, the PLL lock signal processing unit 110e does not detect the falling edge of the undetermined period. Therefore, it is possible to perform control so as not to output an unlocking detection signal that should not be detected.

Second Operation Example of PLL Lock Signal Processing Unit

Next, a mask process by a mask circuit included in the PLL lock signal processing unit 110e will be described with reference to timing charts of FIGS. 13A to 13D. FIG. 13A illustrates a PLL lock signal output from the PLL unit 112c.

As illustrated in FIG. 13A, it cannot be determined whether the PLL lock signal, which is a signal for detecting the unlocked state, is "1 (unlocked)" or "0 (not unlocked)" for a certain period of time after a device inputs an external clock to the PLL unit 112c until an output (subsequent stage clock) from the PLL unit 112c is stabilized. This period is referred to as an "undetermined period". In the undetermined period, the PLL lock signal repeatedly switches between "1" (H) and "0" (L) as illustrated in FIG. 13A.

In the case where noise is removed from the PLL lock signal by the filtering process described with reference to FIGS. 12A to 12D, it may take time to detect that the PLL is locked. As a result, a reset period for a subsequent circuit becomes longer. This increases the number of pieces of data (line data) to be discarded. The mask process compensates for the disadvantage of such a filtering process.

In the mask process according to the present embodiment, a period between the falling edge of the PLL lock signal and the end of the maximum lock signal undetermined period is set as a mask period, as illustrated in FIG. 13C. As a result, it is possible to detect an unlocked PLL without extending PLL lock detection time.

When a predetermined period T2 is used as the mask period as illustrated in FIG. 13C, the falling edge of the PLL lock signal is not detected during the predetermined period T2. Thus, an unlocking detection signal is not output during the undetermined period as illustrated in FIG. 13B, but is output as illustrated in FIG. 13D. Accordingly, it is possible to perform control so as to detect no other period but the unlocking period and so as not to detect the undetermined period.

Operation Example of PLL Reset Signal Generating Unit

Next, a reset assertion period setting process by a reset assertion period setting circuit included in the PLL reset signal generating unit 109e will be described with reference to timing charts of FIGS. 14A to 14C.

A reset period is generally designed so as to satisfy the specifications of a device. However, static noise is applied for a specific period of time. Thus, if a reset period is short, there is a possibility that data are affected by the noise again after reset is canceled. Therefore, a PLL reset period with a length equal to or larger than a predetermined value is ensured. In addition, reset is canceled after the influence of noise has been eliminated. As a result, the PLL unit 112c can be returned to normal operation.

FIG. 14A illustrates a PLL lock signal output from the PLL unit 112c. As already described, there is an undetermined period. Therefore, "reset period T3" is set in the assertion period setting circuit. As a result, when an unlocking detection signal (FIG. 14B) indicates unlocking, a PLL reset signal is asserted during reset period T3. Thus, the PLL unit 112c is reset. The unlocking detection signal is generated with a PLL lock signal from which noise has been removed by the filter circuit.

Flow of Controlling PLL Unlocking Detection Process

Figure 15:
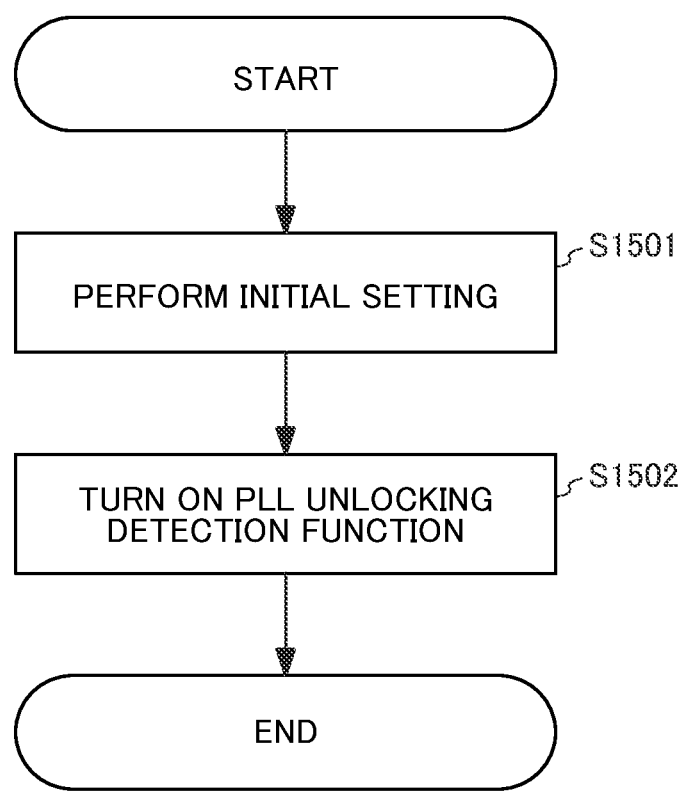
FIG. 15 is a flowchart illustrating an example of the flow of operation of the data processing device according to an embodiment of the present disclosure.

Next, the flow of controlling execution of the PLL unlocking detection process described thus far will be described with reference to a flowchart of FIG. 15.

The operation of the data processing control device 10 is started (power is turned on). Then, after an initial setting (S1501) is completed, a PLL unlocking detection function is turned on (S1502).

The data processing control device 10 is assumed to be implemented by an application specific integrated circuit (ASIC)/Field Programmable Gate Array (FPGA) or the like. In this case, the lock signal changes to a locked state immediately after the operating power to the device is turned on. In this case, in consideration of an undetermined period for the PLL lock signal, there is a possibility of false detection of the unlocked PLL, as described above.

Therefore, while the initial setting is performed at the start of operation as hardware after the operating power is turned on, the PLL unlocking detection function is turned off. Then, after the initial setting is completed, the PLL unlocking detection function is turned on. This can prevent malfunction (false detection) that may occur when the power is turned on.

Embodiment of Image Reading Apparatus

Figure 16:
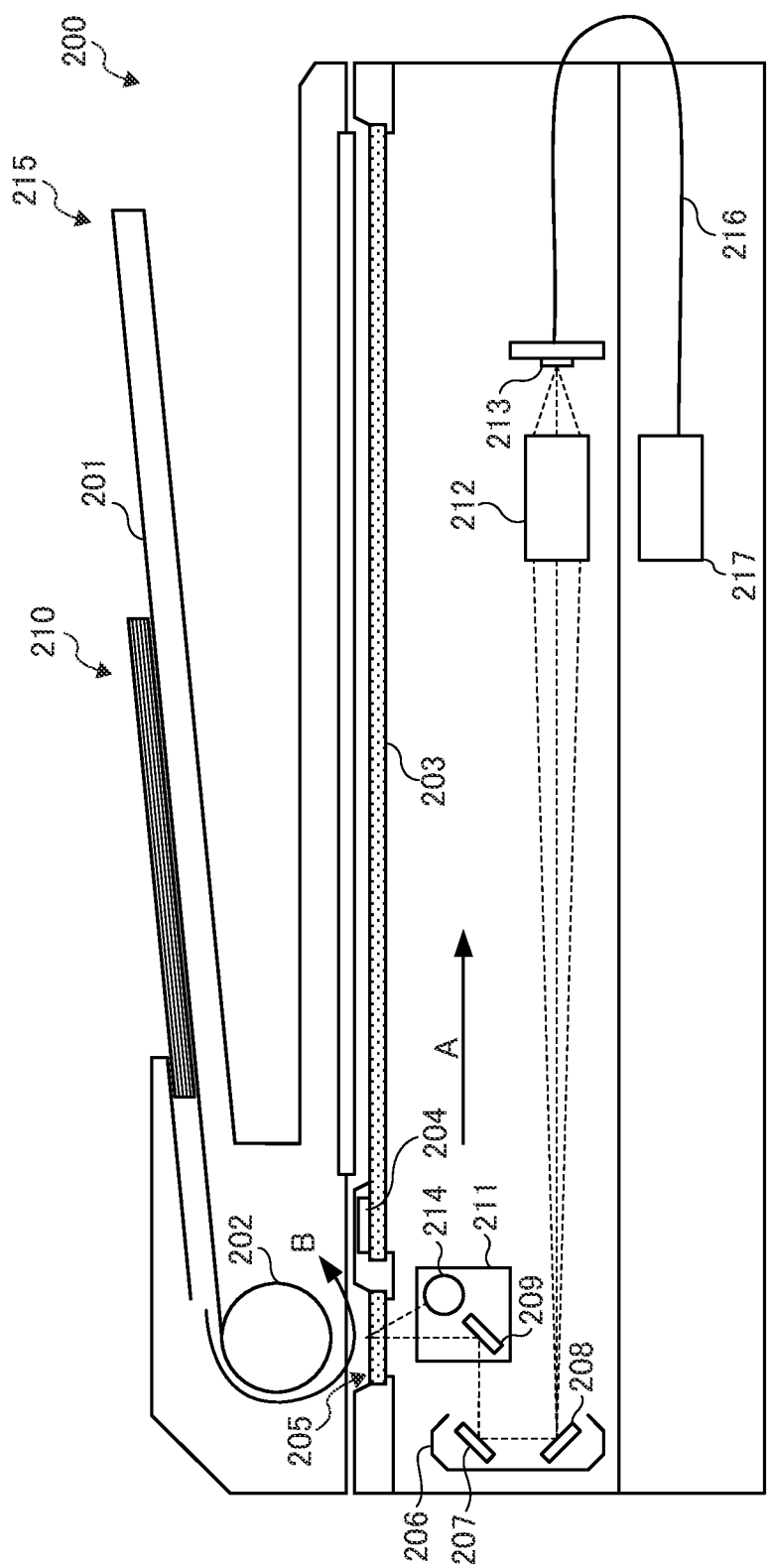
FIG. 16 is a configuration diagram illustrating an image reading apparatus according to an embodiment of the present disclosure.

Next, an image reading apparatus according to an embodiment of the present disclosure will be described with reference to FIG. 16. FIG. 16 is a cross-sectional view of a configuration example of a scanner 200 according to the present embodiment. The scanner 200 is installed on an image forming apparatus such as a digital copying machine, a digital multifunction peripheral, or a facsimile machine. Alternatively, the scanner 200 is used as a single apparatus. The scanner 200 includes at least the data acquisition device 20, the transmission line 40, and the data processing control device 10 described above.

The scanner 200 includes a contact glass 203. A document is placed on the upper surface of the contact glass 203. The scanner 200 further includes a first carriage 211 and a second carriage 206. The first carriage 211 includes a light source 214 for exposure of documents and a first reflecting mirror 209. The second carriage 206 includes a second reflecting mirror 207 and a third reflecting mirror 208. Furthermore, the scanner 200 includes a lens unit 212 for causing light reflected by the third reflecting mirror 208 to be imaged on the light receiving region of an imaging element 213.

The scanner 200 further includes a reference member 204, such as a reference whiteboard, and a sheet-through reading slit 205. The reference member 204 has a reference density, and is used for correcting various distortions caused by a reading optical system and the like. The reference member 204 can be illuminated by the light source 214. The reference member 204 is provided at a position different from the positions of the contact glass 203 and the sheet-through reading slit 205 at which documents are illuminated.

The imaging element 213 can receive, as incident light, reflected light from any of a document placed on the contact glass 203, a document passing through the sheet-through reading slit 205, and the reference member 204.

An automatic document feeder (ADF) 215 is mounted on the upper portion of the scanner 200, and is coupled to the contact glass 203 via a hinge or the like in an openable and closable manner. The ADF 215 includes a document tray 201 as a document placement holder on which a document bundle 210 can be placed. The document bundle 210 refers to a document containing a plurality of sheets. The ADF 215 also includes a separator and a feeder including a feed roller 202. The separator separates document sheets one by one from the document bundle 210 placed on the document tray 201. The feeder automatically feeds the document sheets toward the sheet-through reading slit 205.

Here, a scan mode operation to be performed in the scanner 200 having the above-described configuration will be described. In the scan mode operation, the image surface of a document sheet placed on the contact glass 203 is scanned to read the image of the document sheet.

In the scan mode, the first carriage 211 and the second carriage 206 are moved in a direction of arrow A (sub-scanning direction) by a stepping motor to scan a document sheet. At this time, the second carriage 206 moves at half the speed of the first carriage 211 so as to keep an optical path length from the contact glass 203 to the light receiving region of the imaging element 213 constant.

At the same time, an image surface, which is the lower surface of the document sheet set on the contact glass 203, is illuminated (exposed) by the light source 214 of the first carriage 211. Then, reflected light from the image surface is sequentially reflected by the first reflecting mirror 209 of the first carriage 211 and by the second reflecting mirror 207 and the third reflecting mirror 208 of the second carriage 206. Then, a beam of reflected light from the third reflecting mirror 208 is focused by the lens unit 212 to be imaged on the light receiving region of the imaging element 213.

The imaging element 213 photoelectrically converts the amount of light received by each pixel line by line to obtain an analog electrical signal, and outputs the analog electrical signal. The electrical signal is converted into a digital signal. Then, the gain of the digital signal is adjusted. Thus, image data obtained as a result of reading the image of the document sheet are output. The image data are transmitted via a cable harness 216 to a substrate 217 including the above-described data processing control device 10 and the like. In the case where the cable harness 216 is long, the cable harness 216 is likely to be affected by noise due to a high transmission impedance.

Next, a sheet-through mode will be described. In the sheet-through mode, a document sheet is automatically fed by the ADF 215, and the image of the moving document sheet is read.

In the sheet-through mode, the first carriage 211 and the second carriage 206 move, and then stop moving when the first carriage 211 and the second carriage 206 come to be located below the sheet-through reading slit 205. After that, the feed roller 202 automatically and sequentially feeds document sheets in the document bundle 210 placed on the document tray 201 in a direction of arrow B (sub-scanning direction), starting from the lowermost document sheet. Each of the document sheets is scanned when passing through the position of the sheet-through reading slit 205.

At this time, the lower surface (image surface) of the automatically fed document sheet is illuminated by the light source 214 of the first carriage 211. Then, reflected light from the image surface is sequentially reflected by the first reflecting mirror 209 of the first carriage 211 and by the second reflecting mirror 207 and the third reflecting mirror 208 of the second carriage 206. Then, a beam of reflected light from the third reflecting mirror 208 is focused by the lens unit 212 to be imaged on the imaging element 213.

The imaging element 213 photoelectrically converts the amount of light received by each pixel line by line to obtain an analog electrical signal, and outputs the analog electrical signal. The electrical signal is converted into a digital signal. Then, the gain of the digital signal is adjusted. Thus, image data obtained as a result of reading the image of the document sheet are output. The image data are transmitted via a cable harness 216 to a substrate 217 including the above-described data processing control device 10 and the like. When the reading of the image of a document sheet is completed in this way, the document sheet is discharged to a discharge port.

Note that the imaging element 213 reads an image of reflected light from the reference member 204 illuminated by the light source 214 turned on before reading an image in the scan mode or the sheet-through mode. Then, shading correction data are generated and stored in the imaging element 213 so that the level of each pixel of the image data for one line is kept at a predetermined constant level. After that, when the image of a document sheet is read, shading correction is performed on the image data read by the imaging element 213, based on the previously stored shading correction data. Furthermore, when the ADF 215 includes a conveyance belt, it is also possible to cause the ADF 215 to automatically feed a document sheet to a reading position on the contact glass 203 to read the image of the document sheet even in the scan mode.

Embodiment of Image Forming Apparatus

Figure 17:
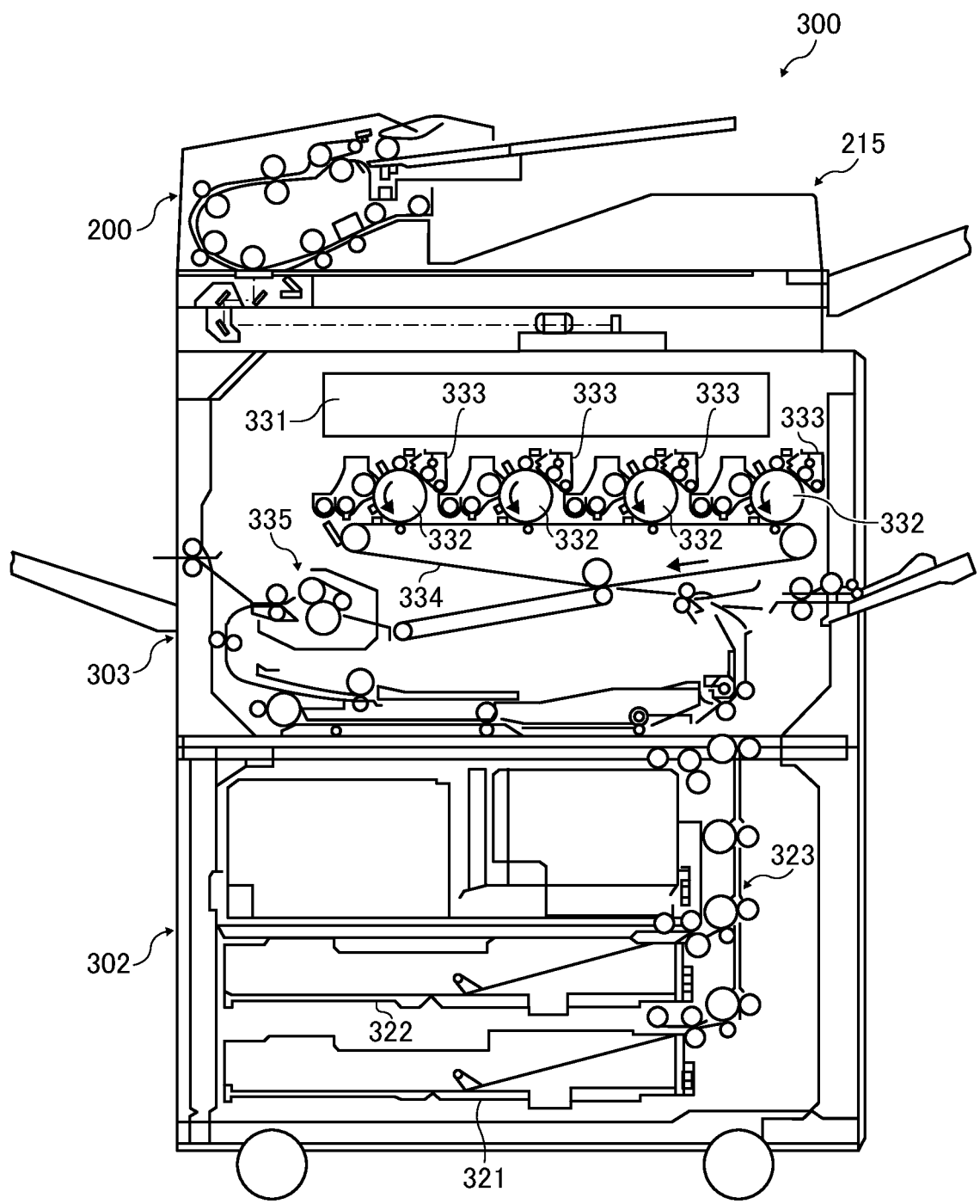
FIG. 17 is a configuration diagram illustrating an image forming apparatus according to an embodiment of the present disclosure.

Next, an image forming apparatus according to an embodiment of the present disclosure will be described with reference to FIG. 17. FIG. 17 is a cross-sectional view of a configuration example of a multifunction peripheral (MFP) 300 according to the present embodiment. The MFP 300 includes at least the data acquisition device 20, the transmission line 40, and the data processing control device 10 described above.

The MFP 300 includes the scanner 200 described above, a sheet feed device 302, and an image forming unit 303 as an image forming device. The sheet feed device 302 includes sheet feed cassettes 321 and 322 and sheet feeder 323. The sheet feed cassettes 321 and 322 store recording paper sheets different in sheet size. The sheet feeder 323 includes various rollers for conveying the recording paper sheets stored in the sheet feed cassettes 321 and 322 to an image forming position of the image forming unit 303. The image forming unit 303 includes an exposure device 331, a photoconductor drum 332, a developing device 333, a transfer belt 334, and a fixing device 335.

Based on image data of a document sheet read by an image reading unit in the ADF 215, the image forming unit 303 causes the exposure device 331 to expose the photoconductor drum 332 to form a latent image on the photoconductor drum 332. Then, the image forming unit 303 causes the developing device 333 to supply different color toners to the photoconductor drum 332 to perform development.

The image forming unit 303 then causes the transfer belt 334 to transfer an image developed on the photoconductor drum 332 to a recording paper sheet supplied from the sheet feed device 302. After that, the image forming unit 303 causes the fixing device 335 to melt toner of a toner image transferred to the recording paper sheet to fix a color image on the recording paper sheet.

The MFP 300 has a function of processing read image data, forming an image on a recording medium, and discharging the recording medium. The image data are read by the scanner 200. The read image data are processed in the image forming unit 303. Therefore, the data processing control device 10 described above can also be applied to the MFP 300. As a result, a good image can be obtained.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A data processing device comprising:
a data processing circuit configured to perform data processing on processing target data by use of an external clock, the processing target data being included in a data signal received from an outside, the external clock being included in the data signal;
a data processing control circuit configured to detect a state of the external clock and control execution of the data processing on the processing target data in accordance with the state of the external clock,
the data processing control circuit configured to operate with a clock having a lower impedance than an impedance of the external clock, and discard the processing target data received during a period in which an abnormality of the external clock is detected, in a case of detecting the abnormality of the external clock; and
an internal clock generator including a phase-locked loop (PLL) circuit and configured to generate, from the external clock, an internal clock to be used for operation of the data processing circuit,
wherein the data processing control circuit detects an abnormality of the external clock based on a PLL lock signal output from the PLL circuit,
wherein the data signal is transmitted by a low voltage differential signaling (LVDS) system, and
the data processing device includes an LVDS receiver circuit configured to receive the data signal.
2. The data processing device according to claim 1, wherein the clock having the lower impedance is generated on a circuit board including the data processing control circuit.
3. The data processing device according to claim 2, wherein the data processing control circuit includes a resetting circuit configured to bring the data processing control circuit and the data processing circuit into a reset state when the external clock is abnormal, and wherein the resetting circuit keeps the data processing control circuit in the reset state for a predetermined period of time or longer.

4. The data processing device according to claim 1, wherein the processing target data includes a synchronization signal for defining a unit of processing.

5. The data processing device according to claim 1, wherein the data processing control circuit includes a resetting circuit configured to bring the data processing control circuit and the data processing circuit into a reset state when the external clock is abnormal.

6. The data processing device according to claim 5, wherein the resetting circuit keeps the data processing control circuit in the reset state for a predetermined period of time or longer.

7. The data processing device according to claim 1, wherein the data processing control circuit detects an abnormality of the external clock when a result of filtering the external clock for a predetermined period of time is abnormal.

8. The data processing device according to claim 1, wherein the data processing control circuit does not detect an abnormality of an external clock for a specific period of time after detecting that the external clock is abnormal.

9. The data processing device according to claim 1, wherein the data processing control circuit operates after completion of an initial setting at a start of operation of the data processing device.

10. The data processing device according to claim 9, wherein the data processing control circuit includes a resetting circuit configured to bring the data processing control circuit and the data processing circuit into a reset state when the external clock is abnormal, and wherein the resetting circuit keeps the data processing control circuit in the reset state for a predetermined period of time or longer.

11. The data processing device according to claim 1, wherein the processing target data include image data.

12. A data processing method to be performed in a data processing device including a data processing circuit configured to perform data processing on processing target data by use of an external clock, the processing target data being included in a data signal received from an outside, the external clock being included in the data signal, the data processing method comprising:

causing a data processing control circuit to detect a state of the external clock, the data processing control circuit being included in the data processing device and configured to operate with a clock having a lower impedance than an impedance of the external clock;

causing the data processing control circuit to discard the processing target data received during a period in which an abnormality of the external clock is detected, in a case of detecting the abnormality of the external clock;

generating, by an internal clock generator including a phase-locked loop (PLL) circuit, from the external clock, an internal clock to be used for operation of the data processing circuit; and detecting, by the data processing control circuit, an abnormality of the external clock based on a PLL lock signal output from the PLL circuit, wherein the data signal is transmitted by a low voltage differential signaling (LVDS) system, and the data processing device includes an LVDS receiver circuit configured to receive the data signal.

13. An image reading apparatus comprising:
a data acquisition device configured to transmit optically read image data together with a clock signal; and
the data processing device according to claim 1, configured to receive the image data and the clock signal from the data acquisition device and perform the data processing on the image data by use of the clock signal.

14. An image forming apparatus comprising:
the data processing device according to claim 1; and
an image forming device configured to form and output an image on a recording medium by use of data processed by a data processing device configured to perform predetermined data processing on processing target data input from an outside.

15. The data processing device according to claim 1, wherein the data processing control circuit includes a resetting circuit configured to bring the data processing control circuit and the data processing circuit into a reset state when the external clock is abnormal, and wherein the resetting circuit keeps the data processing control circuit in the reset state for a predetermined period of time or longer.

* * * * *